United States Patent
Hameed et al.

(10) Patent No.: US 9,768,711 B2
(45) Date of Patent: Sep. 19, 2017

(54) RF-DC POWER CONVERTER

(71) Applicant: THE GOVERNORS OF THE UNIVERSITY OF ALBERTA, Edmonton (CA)

(72) Inventors: Zohaib Hameed, Edmonton (CA); Kambiz Moez, Edmonton (CA)

(73) Assignees: Zohaib Hameed, Saint Paul, MN (US); Kambiz Moez, Edmonton, Alberta (CA)

(*) Notice: Subject to any disclaimer, the term of this patent is extended or adjusted under 35 U.S.C. 154(b) by 0 days.

(21) Appl. No.: 14/740,021

(22) Filed: Jun. 15, 2015

(65) Prior Publication Data

US 2015/0365013 A1    Dec. 17, 2015

Related U.S. Application Data

(60) Provisional application No. 62/011,957, filed on Jun. 13, 2014.

(51) Int. Cl.
*H02M 7/25* (2006.01)
*H02M 3/07* (2006.01)
*H02M 7/10* (2006.01)

(52) U.S. Cl.
CPC ............... *H02M 7/25* (2013.01); *H02M 3/07* (2013.01); *H02M 7/103* (2013.01)

(58) Field of Classification Search
CPC .. H02M 7/25; H02M 3/073; H02M 2003/078; H02M 7/103; H02M 3/07
See application file for complete search history.

(56) References Cited

U.S. PATENT DOCUMENTS

| | | | | |
|---|---|---|---|---|
| 4,847,518 A * | 7/1989 | Leidich | ................... | G01R 1/20 327/315 |
| 4,935,644 A * | 6/1990 | Tsujimoto | ............. | H02M 3/073 327/536 |
| 6,037,622 A * | 3/2000 | Lin | ........................ | G11O 5/145 257/299 |
| 6,130,574 A * | 10/2000 | Bloch | ................... | G11C 16/30 327/536 |
| 6,172,886 B1 * | 1/2001 | Lauterbach | ........... | H02M 3/073 327/536 |
| 6,359,501 B2 * | 3/2002 | Lin | ....................... | H02M 3/073 327/536 |
| 6,603,346 B2 * | 8/2003 | Sawada | ................. | H02M 3/073 327/536 |

(Continued)

*Primary Examiner* — Timothy J Dole
*Assistant Examiner* — Sisay G Tiku

(57) ABSTRACT

A rectifier comprising a chain of transistors for RF-DC conversion. In order to compensate for the thresholds of the transistors, each transistor can be connected to a junction earlier or later in the chain. By using both p-type and n-type transistors in the same chain, the different types of transistors can be compensated in different directions allowing more transistors to be compensated. Additional transistors connected to the gates of transistors of the main chain can allow the transistors of the main chain to be forward compensated at one part of the input cycle and backward compensated in another part to minimize both the voltage threshold of the rectifier and the leakage current. The line for compensation of the voltage threshold during forward conduction can comprise a solid line or a transistor, and if a transistor is used it may be diode-connected.

15 Claims, 14 Drawing Sheets

(56) References Cited

U.S. PATENT DOCUMENTS

| | | | | |
|---|---|---|---|---|
| 6,677,806 B2* | 1/2004 | Bloch | ............... | H02M 3/073 327/536 |
| 7,586,361 B2* | 9/2009 | Fukuda | ............ | H02M 3/073 327/536 |
| 7,592,857 B2* | 9/2009 | Wu | .......... | H02M 3/073 327/536 |
| 2014/0268964 A1* | 9/2014 | Xia | ............ | H02M 7/25 363/127 |

* cited by examiner

RF-DC POWER CONVERTER

CROSS-REFERENCE TO RELATED APPLICATIONS

This application claims the benefit under 35 USC 119(e) of U.S. provisional application Ser. No. 62/011,957 filed Jun. 13, 2014.

TECHNICAL FIELD

Rectification, particularly for RF energy harvesting.

BACKGROUND

The vision of realizing Internet of Things (IoT) pervasively connecting large number of sensors and devices requires development of novel solutions that scavenges ambient energy to supply the power required for the operation of the sensors. Relying on batteries as the source of energy for wireless sensors impose several limitations including the need for routine maintenance/charging of batteries, operation interruption and cost involved in replacing batteries specially those employed in harsh environments, and challenges of scaling of battery-powered wireless sensors to millions of nodes. RF energy from ambient sources can be used to power efficiently the sensor networks with or without batteries. In addition, they can also be used to partially/fully charge other portable electronic devices to extend their battery life.

There is accordingly a growing interest in harvesting ambient energy to partially/fully supply the energy required for the operation of portable electronic devices. Scavenging energy from the ambient electromagnetic wave referred as RF energy harvesting is one of the most popular method for powering low-power wireless sensors. As most of today's integrated circuits are fabricated in CMOS technology, it is highly desirable to integrate RF energy harvesting systems with the rest of the system on a single CMOS chip for reduced cost and small form factor. RF powered devices are widely used in wireless sensor networks operating at power levels of 10 to 100's of µW. RF energy harvesting can be used in applications where the traditional energy sources such as light, vibrations are not available.

In an RF energy harvesting system 20 as shown in FIG. 1, an antenna 22 receives the incident RF signal, an impedance matching circuit 24 maximizes the power transfer from the antenna to the power converter 26, and a RF-DC power conversion circuit 26 converts the incident RF power to DC output power. The output DC voltage is stored in an energy storage component 28 (battery or capacitor) or can directly power the wireless sensors. The major challenge of scavenging RF energy is the limited signal strength of the RF waves and the low efficiency of the harvesting circuit at low input power.

The radiated signals are received by the RF energy harvesting system 20 and converted into a DC output voltage which is used to power-up the system. The radiated signals have to adhere to the regulation standards set by the federal communication commission (FCC). The unlicensed industrial, scientific and medical (ISM) band with a center frequency of 915 MHz operating at 902-928 MHz with a maximum effective isotropic radiated power (EIRP) of 4 W can be used for RF energy harvesting. The major challenge of scavenging RF energy is the limited signal strength of the RF waves and the low efficiency of the harvesting circuit. The signal strength is limited due to the attenuation in the signal due to the free space loss. Also, the power at the transmitter level cannot be increased without violating the FCC guidelines. Hence modification has to be done at the receiver side. The power consumption for the commercial sensor network nodes vary based on the manufacturers and has been estimated by various authors to be around 10 to 100 µW depending on the sensing application and the radio protocol. A multi-volt supply voltage is typically required for the operation of the sensor circuitry.

The power harvester unit 20 comprising a multi-stage rectifier 26 is a key component in RF energy harvesting systems. It converts the incoming weak RF signal into a DC voltage. The performance of the rectifier unit 26 can be evaluated based on its power conversion efficiency (PCE) which is the ratio of power delivered to the load to the input power, based on sensitivity i.e. the minimum input power required for production of a DC voltage at the output and finally based on output DC voltage levels. To increase rectifier's PCE, the energy losses such as those introduced by the non-zero ON resistances of the rectifying devices must be reduced. To increase sensitivity and output voltage levels, rectifying devices with lower threshold voltages are required. Hence, these performance parameters of the power harvester are strongly affected by the threshold voltage of the rectifying devices. The power level has to exceed the threshold voltage of the rectifying device to turn on the rectifier unit in the RF-DC power conversion circuit. The minimum power is referred as the power-up threshold of the system. In terms of voltage level, a minimum input voltage is required for the circuit operation and is referred as the dead-zone of the rectifier.

The performance of an RF energy harvesting system 20 is significantly affected by the threshold voltage of the rectifying device 26, the voltage that is required to turn on the semiconductor devices used as rectifying devices. A rectifying device 26 with lower threshold voltage enables the operation of RF-DC power converter 26 at low input power levels significantly reducing the power-up threshold of the rectifiers, and increasing the output voltage level for the same input power. The threshold voltage of device can be reduced using different technology-based approaches for the devices including silicon-on-sapphire (SOS), schottky diodes such as silicon-titanium schottky diodes or SMS and the HSMS diodes, special low-threshold-voltage transistors in CMOS process, and floating gate transistors which store a pre-charged voltage at the gate to lower the threshold voltage. The drawback of using technology-based approaches is additional fabrication steps that increases the production cost and prevents integration of RF energy harvester in mainstream Complementary Metal-Oxide-Silicon Integrated Circuits (CMOS ICs). Active/passive circuit techniques can be alternatively used to reduce the threshold voltage of the device. Active technique requires an external power source or secondary battery and is generally used in active sensors or active RFID. This enables more sophisticated applications at the price of increased cost and maintenance. Passive techniques do not require an additional source of energy but may require additional circuit where an auxiliary rectification chain is used to generate the compensating threshold voltage for the main RF-DC power conversion circuit. The auxiliary chain requires additional power and occupies additional area. An internal threshold voltage cancellation circuit was introduced in Kocer et al. where the compensating voltage was generated passively and stored in a capacitor that is applied at the gate-source terminal of the MOS transistor. This technique requires a large resistance and high capacitance value which leads to a large area on the chip. A self-biasing technique consisting of an off-chip high impedance resistive network was used by Li et al. to provide DC biasing voltages. Another technique can be using floating gate transistors storing a pre-charged voltage at the gate lowering its threshold voltage. The threshold voltage can be varied by changing the body-source potential of the transistor. This technique requires an additional pre-charge phase making it unsuitable for fully battery-less applications. The RF-DC power conversion circuit consisting of NMOS transistors with grounded body terminal leads to an increase in the threshold with the number of stages due to the body effect. This degrades the efficiency of the power conversion circuit. The body terminal of the transistors can be dynamically controlled using additional circuit or floating well devices. The floating well technique generates undesirable substrate current. Also, a triple-well source-body connected device has high parasitic capacitance leading to reduced efficiency. A cross-coupled differential scheme was used in Sciorcioni et al. consisting of triple-well NMOS and standard PMOS transistors to reduce the threshold voltage. A self-compensation scheme based on the Dickson topology was introduced in Curty et al. consisting of triple-well NMOS transistors to provide individual body biasing. The compensating voltage was provided by connecting the gate terminal to later stages. The design of the power converter in the works was focused on only reducing the threshold voltage neglecting the key role played by the reverse leakage current in introducing power losses. The reduction in threshold voltage increases the reverse conduction current causing additional loss.

To address the trade-off between the reduced threshold voltage and increased leakage current, Lee et al. proposed use of high speed comparators to control the reverse leakage current. The use of comparator increases the power consumption and limits the usefulness of this technique to low-frequency applications. Dynamic CMOS Dickson pump has been designed in previous works to eliminate the $V_{th}$ drop while reducing the reverse leakage current. These circuits are designed for digital application with no emphasis on low-power operation. Differential-drive (4T-cell) architecture with the cross coupled bridge configuration and its variant has been used in previous works to reduce the threshold voltage as well as lower the leakage current. Differential circuit requires a PCB balun for the single-ended to differential conversion or differential antenna. Also, the differential circuit requires triple-well NMOS transistors and larger number of rectifying devices for the same number of stages compared with single-ended one.

SUMMARY

A power conversion circuit is provided having a first input line and a second input line, the first and second input lines configured to receive an alternating voltage differential between the first and second input lines, a multi-stage rectifier comprising transistors arranged in series, each transistor having a gate, a source and a drain, adjacent transistors of the series being connected so that for adjacent p-type transistors the drain of the left p-type transistor is connected to the right adjacent source of the right p-type transistor and source of the right p-type transistor is connected to the left adjacent drain of the left p-type transistor, for adjacent n-type transistors the source of the left n-type transistor is connected to the right adjacent drain of the right n-type transistor and drain of the right n-type transistor is connected to the left adjacent source of the left n-type transistor, for a p-type transistor adjacent to an n-type transistor the source of the right p-type transistor is connected to the source of the left adjacent n-type transistor and drain of the left p-type transistor is connected to the drain of the right adjacent n-type transistor to form a junction, each junction being connected to one of the first input line and the second input line via a capacitor, with adjacent junctions having one junction of the adjacent junctions connected to the first input line and the other junction of the adjacent junctions connected to the second input line, the gate of each transistor of the multi-stage rectifier being connected to a respective junction that is not a junction formed by the connection of that transistor to an adjacent transistor but a junction in the previous stage for the p-type transistor or later stage for the n-type transistor, at least one of the transistor in the multi-stage rectifier being p-type and at least one being n-type.

In various embodiments, there may be included any one or more of the following features: There may also be an auxiliary chain of p-type transistors, each auxiliary transistor having a gate, a source and a drain, each transistor of the auxiliary chain being connected to a p-type transistor of the multi-stage rectifier in the main chain, so that the gate of the respective auxiliary transistor is connected to the source of the respective transistor in the main chain, the source of the respective auxiliary transistor is connected to the gate of the transistor in the main chain and also connected to the previous stage junction of the main chain which is N transistors away from the respective transistor, and the drain of the respective auxiliary transistor is connected to the drain of the respective transistor or to the junction of the later stage transistor in the main chain. There may also be a diode connected transistor on a line connecting the gate of each transistor in the main chain of the multistage rectifier to the junction of previous stages which is N transistors away from the respective transistor. There may also be an auxiliary chain of n-type transistors, each auxiliary transistor having a gate, a source and a drain, each transistor of the auxiliary chain being connected to an n-type transistor of the multi-stage rectifier in the main chain, so that the gate of the respective auxiliary transistor is connected to the source of the respective transistor in the main chain, the source of the respective auxiliary transistor is connected to the gate of the transistor in the main chain and also connected to the later stage junction of the main chain which is N transistors away from the respective transistor, and the drain of the respective auxiliary transistor is connected to the drain of the respective transistor or to the junction of the previous stage transistor in the main chain. There may also be a diode connected transistor on a line connecting the gate of each transistor in the main chain of the multistage rectifier to the junction of later stages which is N transistors away from the respective transistor.

There is also provided an auxiliary chain of transistors, each auxiliary transistor having a gate, a source and a drain, each transistor of the auxiliary chain being connected to a respective transistor of a main chain of a multi-stage rectifier in the main chain, so that the gate of the respective auxiliary transistor is connected to the source of the respective transistor in the main chain, the source of the respective auxiliary transistor is connected to the gate of the transistor in the main chain and also connected to the later stage junction of the main chain which is N transistors away from the respective transistor in the case that the respective transistor is n-type, or to the earlier stage junction of the main chain which is N transistors away from the respective transistor in the case that the respective transistor is p-type, and the drain of the respective auxiliary transistor is connected to the drain of the respective transistor or to the junction of a previous stage transistor in the main chain, in the case that the respective transistor is n-type, or to the junction of a later stage transistor in the main chain, in the case that the respective transistor is p-type.

In various embodiments, there may be included any one or more of the following features: the transistors of the main chain and auxiliary chain may be n-type and there may also be a p-type transistor on a line connecting the gate of each transistor in the main chain of the multistage rectifier to the junction of later stages, such that the gate of the additional p-type auxiliary transistor is connected to the gate of the n-type auxiliary transistor and the source of the n-type and p-type auxiliary transistors are connected, and the drain of the p-type auxiliary transistors is connected to junction of the main chain which is at 'N' later stages from the respective transistor. The transistors of the main chain and auxiliary chain may be p-type and there may also be an n-type transistor on a line connecting the gate of each transistor in the main chain of the multistage rectifier to the junction of earlier stages, such that the gate of the additional n-type auxiliary transistor is connected to the gate of the p-type auxiliary transistor and the source of the n-type and p-type auxiliary transistors are connected, and the drain of the n-type auxiliary transistors is connected to junction of the main chain which is at 'N' earlier stages from the respective transistor. There may also be a diode connected p-type or n-type transistor on a line connecting the gate of each transistor in the main chain of the multistage rectifier to the junction of later stages which is N transistors away from the respective transistor. There may also be a diode connected p-type or n-type transistor on a line connecting the gate of each transistor in the main chain of the multistage rectifier to the junction of earlier stages which is N transistors away from the respective transistor.

In any of the above embodiments, there may be included any one or more of the following features: There may also be an additional transistor connected in series with the multistage rectifier, the additional transistor having a gate, a source and a drain, the gate of the additional transistor being connected to the drain of the additional transistor. The gate of each transistor in the main chain may be connected to the junction of previous stages for p-type transistor and later stages for n-type transistor. N of the transistors in the multistage rectifier arranged in series may be n-type and all but N of the transistors in multistage rectifier arranged in series may be p-type. The second input line may be grounded. The body terminal of each p-type transistor may be connected to the respective drain and the body terminal of each n-type transistor may be either grounded or connected to the respective drain terminal.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

There is provided a hybrid forward and backward threshold voltage compensation scheme for RF-to-DC power conversion. In an embodiment, PMOS transistors are used as rectifying devices in all stages except for the first few stages eliminating the need for triple-well NMOS transistors. The compensating voltage is provided by connecting the gate terminal of the PMOS transistors to previous stages, also referred to as back-compensation, and also by connecting the gate terminal of the initial few NMOS transistors to later stages. Using PMOS transistors as a rectifying device in all the stages except for the first few stages eliminate the need for triple-well NMOS transistors. Also, all the MOS transistors in the main rectification chain are compensated in the proposed scheme. In addition to the hybrid scheme, an adaptive method suitable for rectifying devices operating at low power level is proposed to control the ON/OFF operation of the MOS transistors in the main rectification chain. An auxiliary block consisting of PMOS transistor is introduced to control the switching of the MOS transistors in the main chain. The PMOS transistors in the main chain are back-compensated in the conduction phase and forward-compensated when not conducting; increasing the gate-source potential and reducing the reverse leakage. The controlling voltage of the transistors in the auxiliary chain is derived from the local node of the main chain. Moreover, a procedure for designing matching network to provide passive voltage amplification and maximum power transfer is proposed. The dead-zone of the power converter unit is obtained using Y parameter analysis and the matching circuit is designed at the point of maximum power transfer. The RF-to-DC power conversion circuit may be fabricated using conventional methods such as IBM's 0.13 μm CMOS technology.

Power Harvester Circuit

Figure 1:
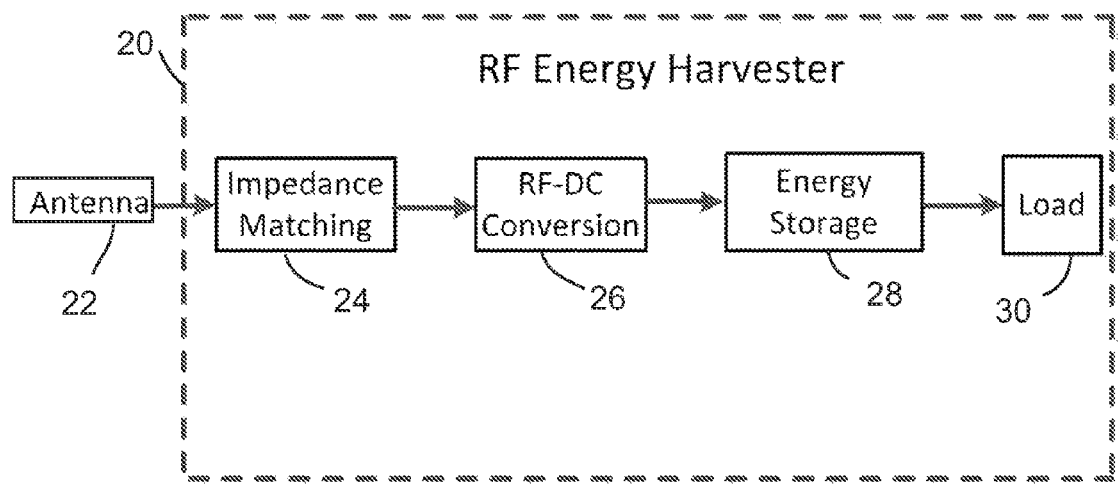
FIG. 1 is a block diagram showing energy flow from a receiver through a power harvester to a load.

FIG. 1 shows a block diagram of the power harvester unit of an RF energy harvesting system 20. In the RF energy harvesting system shown, the signal is received by an antenna 22. An impedance matching circuit 24 comprising a high quality factor (Q) resonator is used to ensure that maximum power is transferred from the receiver to the rectifier block 26. However, the matching network itself introduces some energy losses because of the limited quality factors of on-chip passive inductors and capacitors required to match the input impedance of the rectifier to the output impedance of the antenna. The high Q resonator can also provide passive voltage amplification of the input signal. Depending on the embodiment, the high Q resonator may have a fixed frequency or may be tuneable. The next block is the RF-to-DC power conversion circuit 26 that converts the RF signal to DC voltage. The rectifier preferably operates at low input power levels while providing high power conversion efficiency. Several rectifier units may be cascaded to increase the overall output voltage, referred collectively as a voltage multiplier. There may be a power management block (not shown) to control the flow of power from the energy harvester to the load. The harvested power is then finally used to charge an energy storage device 28 such as a battery or a capacitor, which in turn powers a load 30. Alternatively, the energy storage device may be omitted and the load powered directly by the power harvester. The power management block may also be omitted with or without the energy storage.

Rectifier Circuit

Figure 2A:
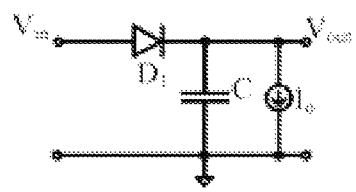
FIG. 2A is a schematic diagram of a prior art half-wave rectifier using a diode.
Figure 2B:
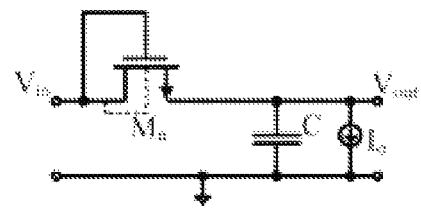
FIG. 2B is a schematic diagram of a prior art half-wave rectifier using diode-connected NMOS.
Figure 2C:
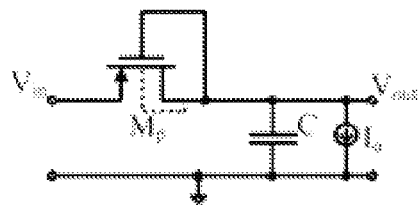
FIG. 2C is a schematic diagram of a prior art half-wave rectifier using diode connected PMOS.
Figure 2D:
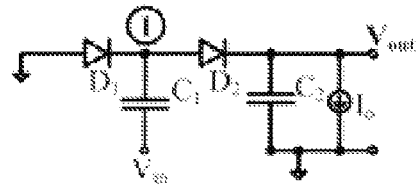
FIG. 2D is a schematic diagram of a prior art voltage doubler full wave rectifier using diodes.
Figure 2E:
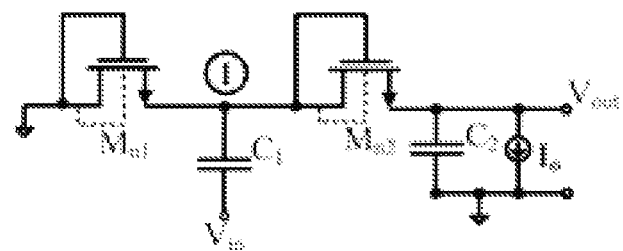
FIG. 2E is a schematic diagram of a prior art voltage doubler full wave rectifier using diode connected NMOS.
Figure 2F:
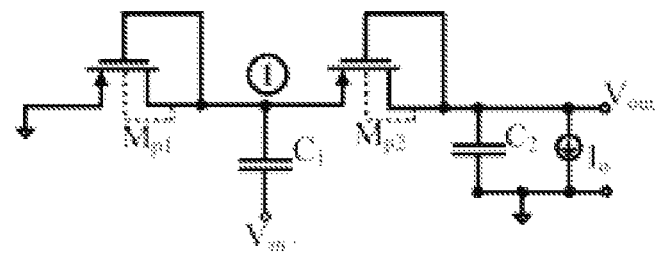
FIG. 2F is a schematic diagram of a prior art voltage doubler full wave rectifier using diode connected PMOS.

In half-wave rectifiers, the rectifying device is conducting for half of the cycle, passing the input voltage to the output. However, the output voltage is lower than the input by the amount of voltage drop needed for turning ON the rectifying device. A half-wave rectifier can be implemented using diodes as shown in FIG. 2A. The voltage drop across the device depends on the threshold voltage of the diode. FIGS. 2B and 2C show half-wave rectification circuits implemented using diode-connected NMOS and PMOS transistors respectively in CMOS technology. The voltage drop in this case depends on the threshold voltage of the transistor. Both diode-connected PMOS and NMOS transistors can be used as rectifying devices. FIG. 2D shows the voltage doubler unit which is a cascade of two half-wave rectifiers. The voltage doubler rectifies the AC input in both the positive and negative cycles. Similar to the half wave rectification, the diodes are implemented by connecting the drain and the gate terminal of the MOS transistor together such that the transistor is always in saturation region in forward bias condition, as shown in FIGS. 2E and 2F.

Figure 3A:
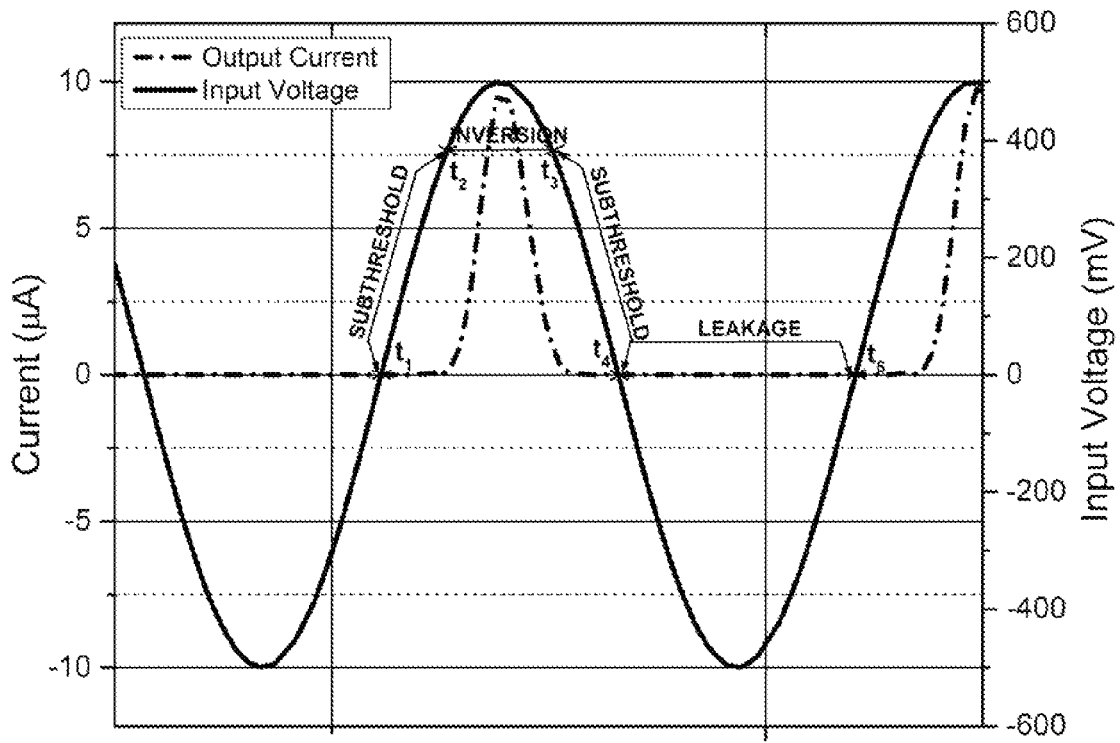
FIG. 3A is a graph of output current with respect to input voltage for a prior art PMOS voltage doubler as shown in FIG. 2F.

The voltage doubler may be used as a basic unit in a power conversion circuit. FIG. 2F shows an example voltage doubler. In the voltage doubler, each of the transistors conducts only during one half of the input cycle. $M_{P1}$ conducts during the negative phase while $M_{P2}$ conducts during the positive phase of the input cycle. Each of the transistors goes through the sub-threshold region, inverse region and the leakage region. The maximum voltage at the output of voltage doubler is $2V_{amp}-|VTP1|-|VTP2|$, where $V_{amp}$ is the maximum amplitude of the input signal and $V_{TP1}$, $V_{TP2}$ are the threshold voltages of the diode-connected transistors $M_{P1}$ and $M_{P2}$ respectively. Thus the maximum possible voltage is twice the RF signal's amplitude only when the threshold voltage of the transistors is equal to zero. To understand the operation of the voltage doubler in detail, we can look at the transient analysis of the doubler circuit of FIG. 2F, as shown in FIG. 3A. There are three regions of operation of the circuit as seen from FIG. 3A. It is described as follows: the subthreshold operation extends from $V_{in}=0$ to $V_{in}=|V_{TP}|$, where $V_{in}$ is the input voltage. The current in this region is an exponential function of the input voltage. The inversion region extends from $V_{in}=|V_{TP}|$ to $V_{in}=V_{amp}$. The current in the in this region is a square function of the input voltage. In the inversion region, the output current reaches its peak value when $V_{in}=V_{amp}$. Finally, the leakage region extends from $V_{in}=0$ to the next $V_{in}=0$ in the negative half-cycle. The current that flows through transistor $M_{P2}$ during this time interval is referred as reverse leakage current. Thus, the actual charge transfer mechanism is only for a short duration while other parameters such as sub-threshold and reverse leakage currents have to be considered for the rest of the cycle.

Figure 4A:
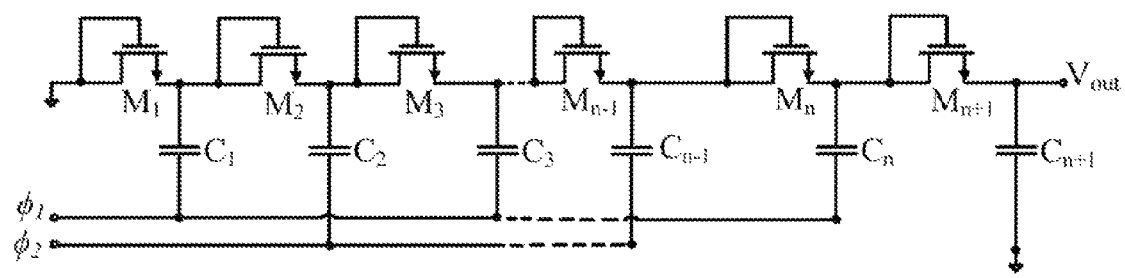
FIG. 4A is a schematic diagram of a prior art NMOS Dickson charge multiplier.
Figure 4B:
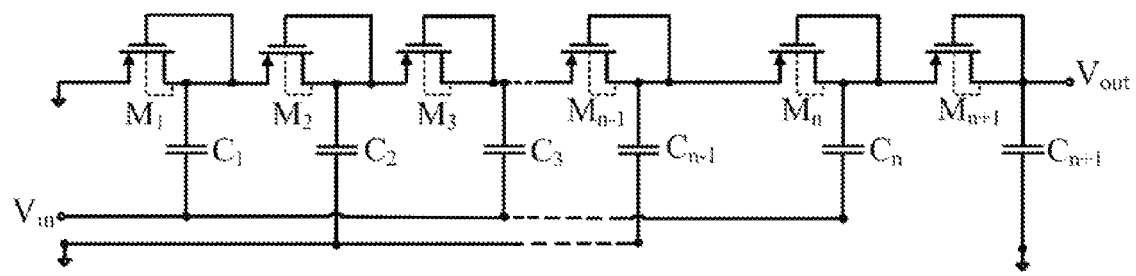
FIG. 4B is a schematic diagram of a prior art PMOS Dickson charge multiplier.

Several voltage doublers can be cascaded to increase the overall output voltage. These voltage multipliers are also known as "charge pumps" and can generate a voltage several times larger than their input supply voltage. The Dickson multiplier with diode-connected transistors is commonly used for integrated applications. The Dickson multiplier of FIG. 4A is modified for low power energy harvesting applications by grounding the $\phi_2$ (out of phase) clock terminal and applying the input signal at the $\phi_1$ terminal. FIG. 4B shows the conventional Dickson multiplier with the PMOS voltage doubler as a rectifier unit. The body terminal of the transistors is connected as shown in FIG. 4B to further reduce the threshold voltage while the transistors are conducting. For example, in the positive phase of the input cycle, transistors $M_2$, $M_{n-1}$ and $M_{n+1}$ are conducting. The source of the transistors is at a higher potential compared to the body terminal. This reduces the threshold voltage in the conducting region. At the same time, transistors $M_1$, $M_3$ and $M_n$ are in the reverse region (leakage operation). The gate-source and the body-source potential is zero for these transistors. Thus, the threshold voltage of transistors $M_2$, $M_{n-1}$ and $M_{n+1}$ while they are conducting is lower than the threshold voltage of the transistors $M_1$, $M_3$ and $M_n$ which are in the reverse region in the positive input phase. Similarly, in the negative phase of the input cycle, transistors $M_1$, $M_3$ and $M_n$ which are conducting have a lower threshold voltage than the transistors $M_2$, $M_{n-1}$ and $M_{n+1}$.

To increase the output voltage of multi-stage rectifiers, the number of rectifier stages must be increased accordingly. However, as the number of stages increases the power conversion efficiency is reduced as larger number of the transistors dissipates more power. Also, the threshold voltage of the standard MOS transistor which lies around 450 mV in 130 nm technology, reduces the sensitivity of the power harvester block. As the number of stages in the rectifier increases, the power losses increases, reducing the overall efficiency. Too few of stages, leads to low output DC voltage even if the PCE is high. To achieve a high DC voltage, large transistors have to be used, leading to high leakage and parasitic losses whereas smaller transistor size affects the charge transfer leading to low DC voltage. The strategy while designing the multi-stage rectifier circuit of FIG. 4B is as follows: The individual stages of the voltage doubler can be cascaded to increase the output voltage. As the number of stages increases, the output voltage increases. With the increase in the number of stages, the PCE decreases and the output voltage saturates. Hence the transistors as well as the pumping capacitors are scaled while increasing the stages. The scaling is done to maintain the incremental voltage per stage and the PCE relatively constant with the increase in the number of stages. Thus the PCE can be maintained with proper device scaling while increasing the DC voltage for a constant output power. The scaling of width and the pumping capacitance with the stages results in impedance looking into the rectifier to be unchanged so that the input power and thus the PCE remains constant. Thus, when designing a multistage rectifier unit one can optimize of number of stages and width of the transistors to maximize the PCE for a given output voltage.

Figure 5:
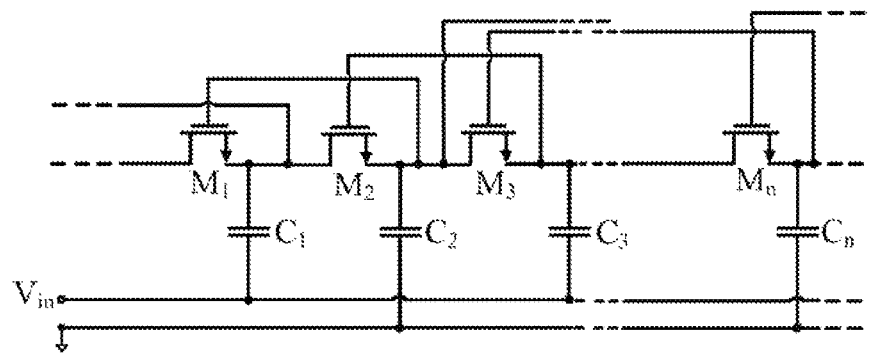
FIG. 5 is a schematic diagram of a prior art forward compensated charge multiplier.

The standard Dickson multiplier can be modified for designs involving energy harvesters where the input voltage is low. FIG. 4A shows an N-stage conventional Dickson multiplier. A threshold self-compensation technique was described by Dickson. The gate of the transistor in this technique is connected to the adjacent source of the transistor instead of the traditional diode-connected structure. Thus, providing bias voltage equivalent to the incremental voltage across each stage. Based on this technique, a forward compensated topology was implemented by Papotto et al. where the bias voltage was increased by extending the gate length connection. FIG. 5 shows the basic forward compensated NMOS topology.

Threshold voltage reduction techniques requiring additional circuits are not suitable for integrated low power energy harvesting applications as these circuits occupy large areas and cause additional power dissipation. Passive threshold voltage reduction technique such as the self-compensation method of FIG. 5 does not require additional circuit and can reduce the threshold voltage. In the self-compensation method, the threshold voltage of the diode-connected NMOS transistors increases with the stages due to the body effect. The body effect can be dynamically controlled using additional circuits but generates undesirable substrate current. Another alternative is using triple-well process to individually bias the body terminal of NMOS transistors and reduce the threshold voltage variation. Additional parasitic capacitance is introduced due to the well structure increasing the losses at each node and affecting the overall efficiency.

Hybrid Forward and Back-threshold compensated power converter

Figure 6A:
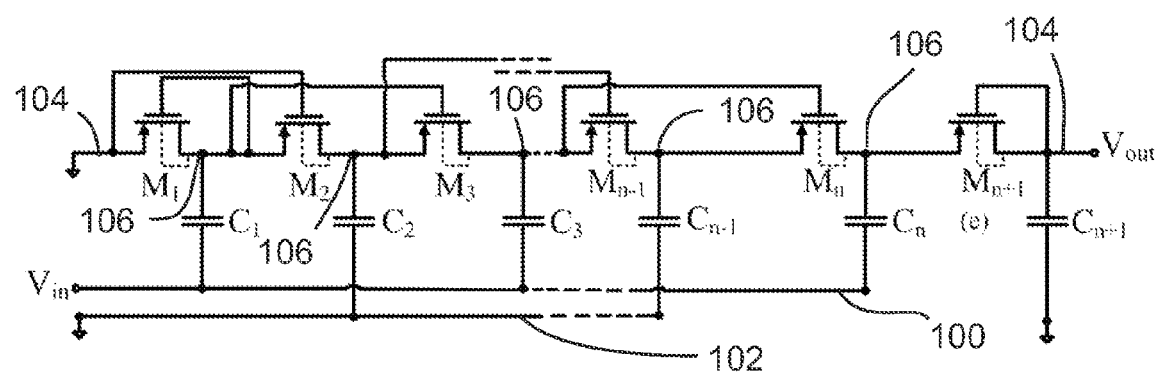
FIG. 6A is a schematic diagram of a level-1 back compensated PMOS charge multiplier.
Figure 6B:
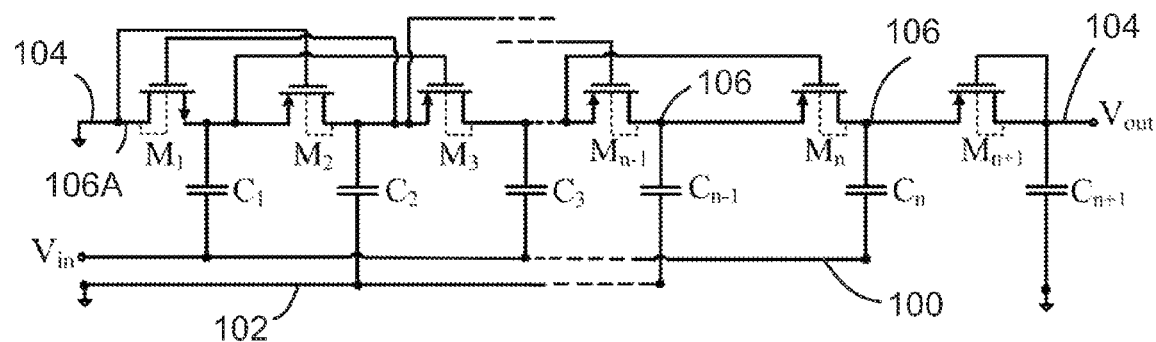
FIG. 6B is a schematic diagram of a level-1 hybrid forward and back-compensated multiplier using NMOS and PMOS.
Figure 6C:
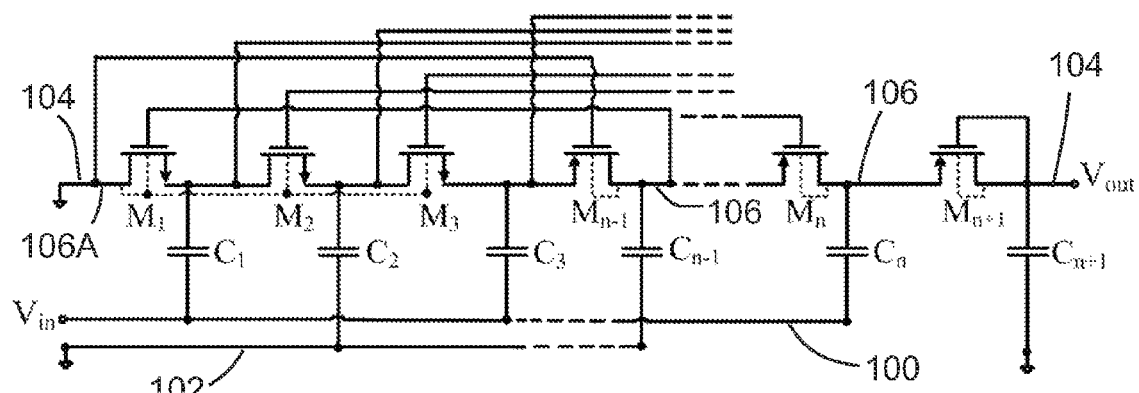
FIG. 6C is a schematic diagram of a level-3 hybrid forward and back-compensated multiplier using NMOS and PMOS.

In order to eliminate the need for triple-well processes, we propose a threshold voltage compensation technique scheme as described below. PMOS transistors are used instead of NMOS transistors as rectifying devices. As each PMOS transistor has its own n-well, the body of PMOS transistor can be biased individually without the necessity of a triple-well CMOS process. Unlike an NMOS transistor which needs a higher potential at the gate terminal to offset the threshold voltage, a PMOS transistor requires negative gate-source potential. Therefore, the threshold voltage of PMOS transistors can be reduced by connecting the gate potential to the previous node rather than later node. As shown in FIG. 6A, alternating input voltage $V_{in}$ is applied on first input line 100 to odd-numbered capacitors $C_1$, $C_3$, ... $C_n$. Ground voltage is applied on second input line 102 to even numbered capacitors $C_2$, ... $C_{n-1}$. Capacitor $C_{n+1}$, while also even-numbered, is shown as connected to ground by a separate line. A third line 104 accumulates voltage for the output and is connected to ground at one end and to output at the other. In this and other figures, the end of the line having more negative voltage, which in the embodiments shown is ground, is shown at the left of line 104 and the end of the line having more positive voltage, which in the embodiments shown is the output, is shown at the right of line 104. The capacitors are each connected to line 104, and are numbered in the order in which they are connected to line 104 from left to right. Each capacitor maintains a respective voltage differential between the respective input line it is connected to and the part of line 104 it is connected to. This voltage differential varies over time as current flows through line 104 between capacitors. Line 104 comprises transistors $M_1$, $M_2$, $M_3$, ... $M_{n-1}$, $M_n$, $M_{n+1}$ arranged in series, a transistor being arranged between each pair of adjacent capacitors and between capacitor $C_1$ and ground. Adjacent transistors define junctions 106, the capacitors being connected to the junctions. The body terminal of each transistor is connected to the drain terminal of the same transistor, as shown by dotted lines. The gate of the first transistor (for n-level compensation, the first 'n' transistors) and the last transistor are connected to their respective drains. The gates of the other transistors are connected to the drain of the transistor n+1 transistors to the left of the respective transistor. The proposed scheme as shown in FIG. 6A reduces the threshold voltages of all PMOS transistors except the first one leading to an increased output voltage. For an n-level compensation, for the proposed scheme, there will be 'n' initial PMOS transistors that will be uncompensated as seen from FIG. 6A To solve this problem, 'n' uncompensated PMOS transistors are replaced by NMOS transistors with grounded body terminals as seen from FIG. 6B. As shown in FIG. 6B, the first transistor is an NMOS transistor with a source connected to the source of the PMOS transistor to its right to define a junction and has a gate connected to the junction n stages to the right of the junction defined by its source. That is, the gate is connected to the junction defined by the source of the PMOS transistor 2 (i.e, n+1) transistors to the right. The other transistors are PMOS and, apart from the last, each has a gate connected to a junction n stages to the left of the junction defined by its source. For the purposes of the preceding statement and statements about junctions elsewhere in this document, the grounded end of line 104 can be considered to be a junction 106A one stage from the junction defined by the connection of $M_1$ and $M_2$. Thus the compensating voltage is provided by connecting the gate terminal to later stages for the first few NMOS transistors and connecting the gate terminal to previous stages for PMOS transistors. The scheme shown in FIG. 6A and FIG. 6B is level-1 compensation. The compensation level can be increased by connecting the gate terminal of PMOS to the source terminals of the transistor of the following stage rather than the source of its immediate neighbor. The last transistor of the multiplier is left uncompensated to reduce the leakage. FIG. 6C shows the proposed level-3 hybrid forward- and back-compensated multiplier. As shown in FIG. 6C, the first 3 (i.e., n) transistors are NMOS transistors with grounded body terminals. Each NMOS (more generally, n-type) transistor has its source on the left and drain on the right, and each PMOS (more generally, p-type) transistor has its drain on the left and source on the right, where "left" and "right" are defined so that that the end of line 104 with more positive voltage is the "right", as shown in the figures. "Earlier" and "later" can also be used to mean "left" and "right". While ground is shown in the figures to the left and the output to the right, the ground could also be to the right and the output to the left. See below for a discussion of the definitions of "source" and "drain". The gates of these first 3 NMOS transistors are connected to the respective junctions 106 three (that is, 'n') stages to the right of the junctions defined by their respective sources. The remaining transistors except the last are PMOS transistors with gates connected to the junctions 106 three (that is, 'n') stages to the left of the junctions defined by their respective sources. Increasing the level of compensation leads to reduction in the threshold voltage which improves the forward conduction but also leads to increased reverse leakage current degrading the rectifier's PCE. Only odd level compensation is used as it maximizes the source-gate potential of PMOS transistors due to the alternating voltage phase with successive nodes.

Figure 7:
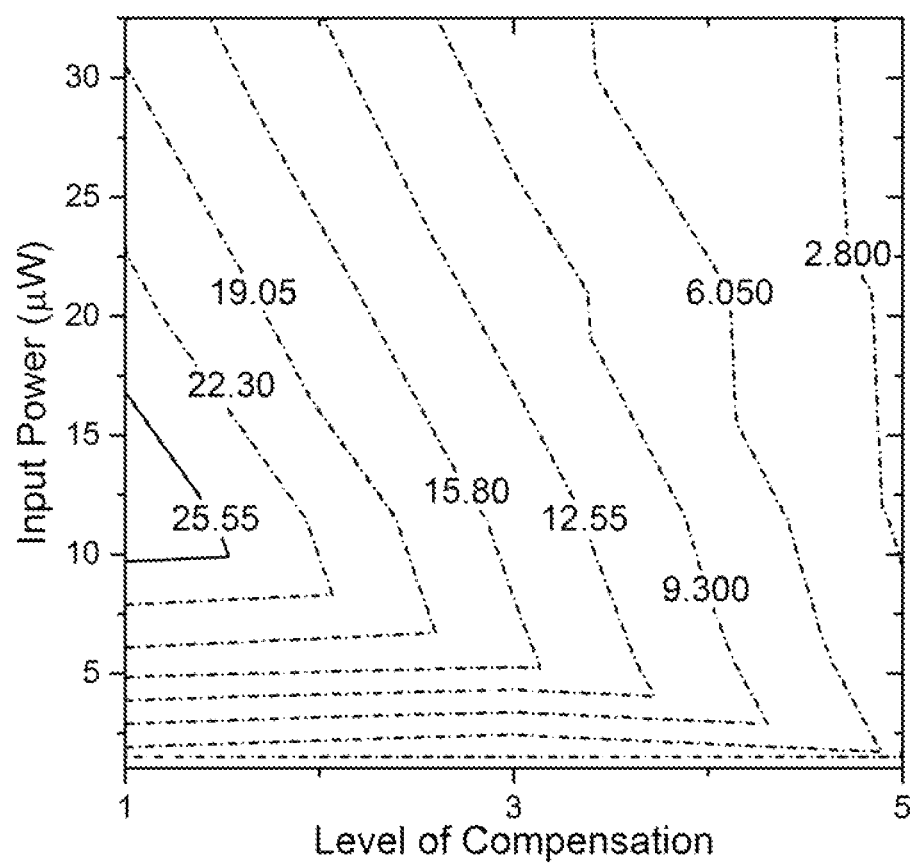
FIG. 7 is a contour plot of constant efficiency for input power versus level of compensation.
Figure 8A:
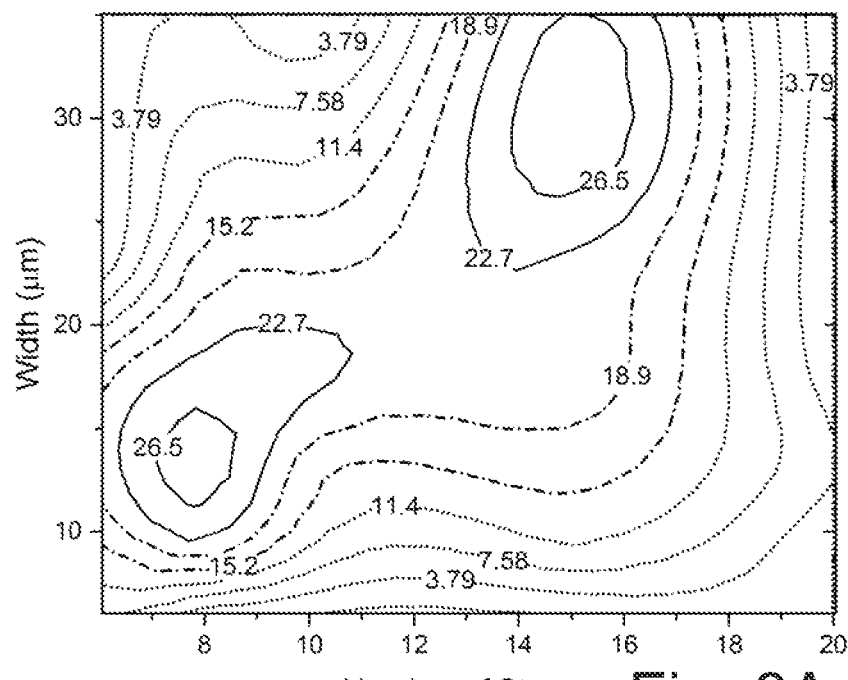
FIG. 8A is a contour plot of constant efficiency for width versus number of stages for a level-1 compensated multiplier.
Figure 8B:
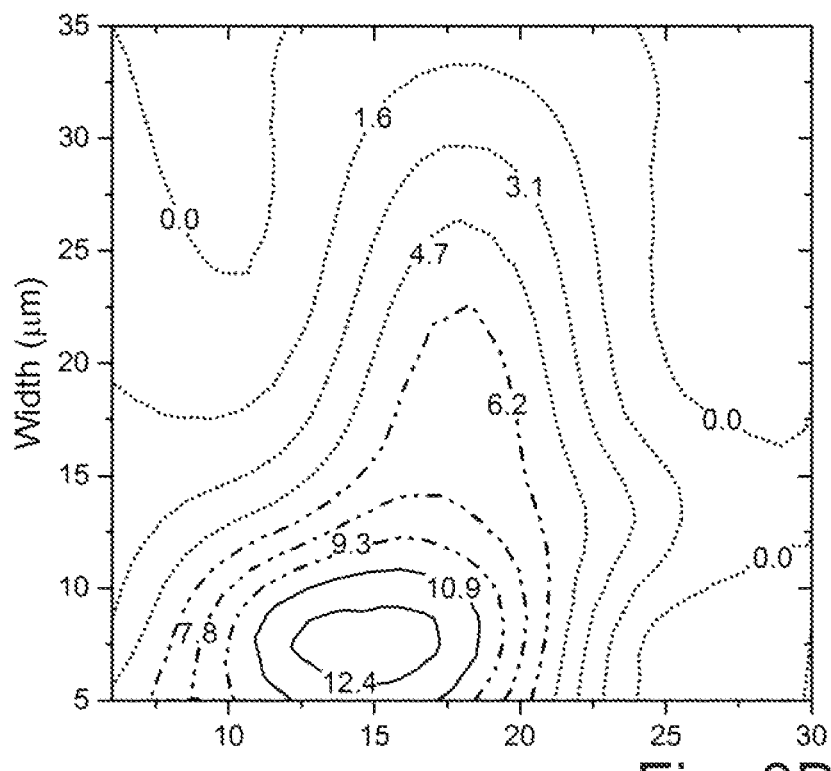
FIG. 8B is a contour plot of constant efficiency for width versus number of stages for a level-3 compensated multiplier.

To find the optimum number of stages and level of compensation, extensive simulations were conducted. FIG. 7 shows the efficiency contour plots with different level of compensation and input power level. Maximum PCE at the lowest input power level is obtained when the level of compensation is one. As the level of compensation increases, the reverse current increases which causes additional power loss and degradation in efficiency. Hence level-1 compensation gives the maximum efficiency while level-3 or higher is advantageous in reducing the threshold voltage of the RF-DC power conversion circuit. FIG. 8A shows the constant efficiency contour plot as a function of transistor width and the number of stages for level-1 compensation. Eight-stage of doubler design equivalent to 16-stage rectifier with transistor width of 13-µm and fifteen-stage of doubler design equivalent to 30-stage rectifier with transistor width of 28 µm gives the highest efficiency contour. The former one is preferred due to lesser area on the chip. The level-1 and level-3 compensated multi-stage rectifier are referred to as efficiency circuit and voltage circuit respectively Similarly for the voltage circuit constant efficiency contour plot as a function of width and the number of stages is plotted as shown in FIG. 8B. Twelve-stage of doubler design equivalent to 24-stage rectifier with transistor width of 8 µm is selected based on the plot. For level-3 compensation, more body-grounded NMOS transistors are required compared with the level-1. Also, the reverse leakage loss is higher for level-3 compensation due to the larger compensating voltage compared with the level-1 compensation. Increasing the level of compensation lowers the minimum input voltage requirement whereas increasing the number of stages while lowering the width of the transistors was based on the design strategy discussed earlier.

During the positive input phase, transistors $M_2$, $M_{n-1}$ and $M_{n+1}$ in FIGS. 6A-6C are conducting. Since the gate terminals are connected to the previous node $V_{SG}$ in the positive phase (conduction) is relatively high compared to the conventional Dickson multiplier. However, in the negative phase when the transistors $M_2$, $M_{n-1}$ and $M_{n+1}$ should ideally be not conducting, the $V_{SG}$ is higher compared to the conventional case. Thus the hybrid forward and back-threshold compensated scheme is effective in increasing the forward conduction current but increases the reverse leakage current at the same time. As seen in FIG. 7, with the increase in the level of compensation the PCE degrades. The simulated maximum PCE of 28% degrades to 11% from level-1 compensation to level-3 compensation respectively. To ameliorate this issue an adaptive scheme is proposed to control the reverse leakage current.

Figure 2G:
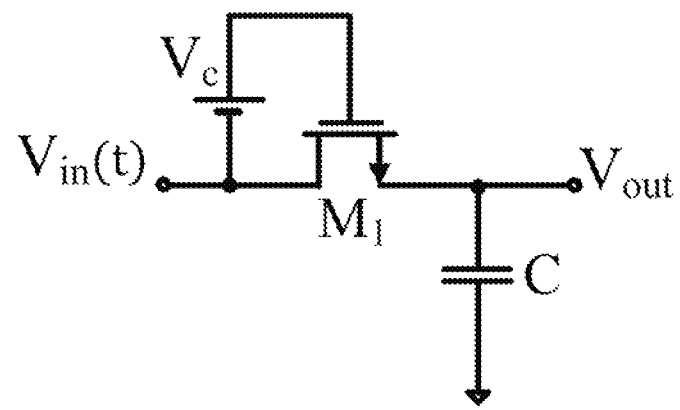
FIG. 2G is a schematic diagram of a prior art threshold-compensated transistor in a single-stage rectifier.
Figure 3B:
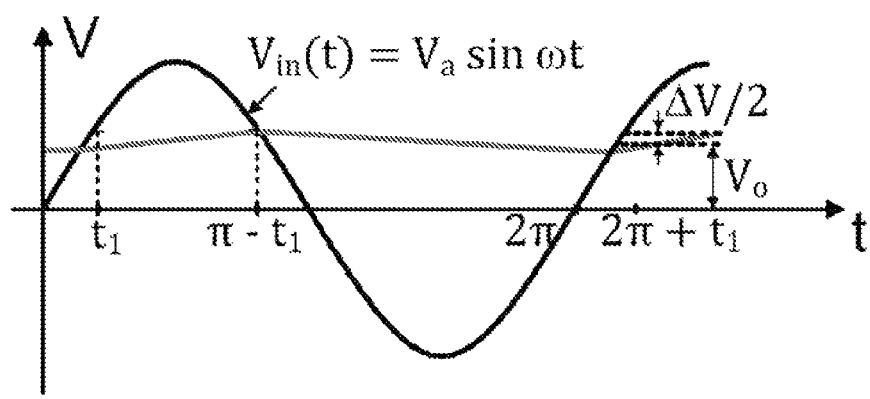
FIG. 3B is a graph showing input and output voltage over time of the threshold-compensated transistor of FIG. 2G.

Especially at extremely low input power (e.g. micro-watts power level), the reverse leakage current has a significant adverse effect on the PCE and the output DC voltage of an RF rectifier as proven by the following analysis. Considering a threshold-compensated transistor of a single-stage rectifier shown in FIG. 2G driven by an input source $V_{in}=V_a \sin \omega t$ assuming the compensation voltage is modeled by $V_C$ and its input and the output steady-state voltage waveforms shown in FIG. 3B, the overall PCE is defined as $$PCE = \frac{P_{out,forward} - P_{leakage}}{P_{input}} \quad (1)$$

where $P_{out,forward}$ is the output power delivered to the load when transistor is forward-biased, $P_{leakage}$ is the output power lost due to leakage when transistor is reverse-biased, and $P_{input}$ is the input power. The forward region extends from $t=t_1$ to $t=\pi-t_1$ with the current $I_d(t)$ through the MOS transistor $M_1$ as seen in FIG. 3B.

$$\frac{P_{out,forward}}{P_{input}} = \frac{\frac{1}{\pi-2t_1}\int_{t_1}^{\pi-t_1} V_{out} \cdot I_d \cdot dt}{\frac{1}{\pi-2t_1}\int_{t_1}^{\pi-t_1} V_{in} \cdot I_d \cdot dt} = \frac{\frac{1}{\pi-2t_1}\int_{t_1}^{\pi-t_1} (V_a - V_{TH} + V_c) \cdot dt}{\frac{1}{\pi-2t_1}\int_{t_1}^{\pi-t_1} V_a \sin\omega t \cdot dt} \quad (2)$$

Assuming the ripple voltage variation $\Delta V$ is much smaller than the average output voltage $V_o$, the output voltage for the one-stage rectifier can be expressed as $V_o = V_a - V_{TH} + V_C$ where $V_{TH}$ is the threshold voltage of the transistor. Performing integration on (2) gives the ratio of the output power in the forward region to the input power as $$\frac{P_{out,forward}}{P_{input}} = \frac{\omega \cdot (\pi - 2t_1) \cdot (V_a - V_{TH} + V_c)}{2V_a \cos\omega t_1} \quad (3)$$

The value of $t_1$ lies between $0 < t_1 < \pi/2$ based on the value of $V_{TH} - V_C$. The time $t_1$ indicates the onset of inversion region and is close to zero when the compensating voltage is near the threshold voltage and will be closer to $\pi/2$ when the compensating voltage is near-zero value. As seen in (3), the ratio of the output power in the forward region to the input power increases with increased voltage compensation in the forward region. In the reverse-biased region, the leakage current is expressed as $$I_{leak}(t) = I_o \cdot (W/L) \cdot e^{(V_{gs}-V_{TH})/\eta V_T} \cdot (1 - e^{-V_{ds}/\eta V_T}) \quad (4)$$

Replacing the gate-source bias voltage by $V_C$, source-drain bias by $V_{in}(t)-V_{out}$ and $V_{in}$ by $V_a \sin \omega t$, the leakage current as a function of time can be expressed as $$I_{leak}(t) = I_o \cdot (W/L) \cdot e^{(V_C-V_{TH})/\eta V_T} \cdot (1 - e^{(V_a \sin \omega t - V_a + V_{TH} - V_C)/\eta V_T}) \quad (5)$$

where $(\pi-t_1) < t < (2\pi+t_1)$. With increase in the compensation, the power loss increases due to the higher leakage current. As seen in (3) and (5), the ratio of the output power in the forward region to the input power even though increases with larger threshold-voltage compensation, the losses in the leakage region is higher due to the increased compensation. This indicates the fundamental trade-off between the level of threshold-voltage compensation and the leakage current of the transistors.

In a field effect transistor, the "source" and "drain" terminals are defined by the direction of flow of charge carriers when the transistor is "on": charge carriers flow from the source to the drain. For an n-type transistor, the charge carriers are electrons and for a p-type transistor the charge carriers are holes. As electrons flow from negative to positive, the source of an n-type transistor is at a lower voltage than the drain and vice versa for a p-type transistor. FETs do not necessarily have any asymmetry between the source and drain terminals beyond this. In the present system, the relative voltages of the source and drain terminals reverse in the normal course of events, as the system is exposed to alternating current in order to rectify it. There are two possible approaches to defining which terminal is the "source" and which terminal is the "drain" in this circumstance. One possible approach is to say that which terminal is the "drain" and which terminal is the "source" varies over time depending on which terminal is at the higher voltage. Thus, by this first definition, the source of an n-type transistor is whichever of the source and drain terminals has the lower voltage at any given moment, and for a p-type transistor whichever has the higher voltage at a given momentA second approach, however, is possible where the desired conduction is in a particular direction only. In the present system, conduction in one direction is desirable and conduction in the other ("leakage") is undesirable, thus the source can be defined according to which terminal is the source when current flows through the transistor in the desired direction; which terminal is considered the "source" and which terminal is considered the "drain" does not change over time in this approach despite the change in voltages. In the discussion here concerning the source-gate voltage ($V_{SG}$), the first approach is used, i.e. the source-gate voltage is the voltage between the gate and whichever of the source or drain terminals that has the higher or lower voltage at a given time depending on if the transistor is p-type or n-type. In addition, while the sign of a source-gate voltage difference required to operate a transistor depends on whether the transistor is p-type or n-type, $V_{SG}$ is discussed as if the voltage to operate the transistor is always positive for p-type transistor and negative for n-type transistor. For other purposes in this document including the claims, a version of the second approach to defining which terminal is the source and which is the drain is used in which the direction of desired current is based on the desired current direction through the device as a whole. Thus, throughout the figures, p-type transistors are shown as having their sources to the left and n-type transistors are shown as having their sources to the right.

A diode-connected transistor is a transistor in which one of the source and drain terminals is connected to the gate to cause the transistor to act as a diode. A diode connected FET allows charge carriers to flow from the terminal not connected to the gate to the terminal connected to the gate, if sufficient voltage is applied, and blocks charge carriers from flowing in the opposite direction. The diode connected transistor is diode connected because it is desired that current flow in one direction is allowed and in flow in the other direction blocked. Thus, following a version of the second approach above to defining which terminal is the source and which terminal is the drain based on desired current through the individual transistor, the source or drain terminal of a diode connected transistor that is connected to the gate would be by definition the drain of the diode connected transistor. However, in this document it is the desired current through the device as a whole that is used, thus in e.g. FIG. 9A transistor $M_{na}$ is diode-connected and the terminal connected to the gate is depicted as the source.

To investigate the effect of the level of threshold-compensation on the PCE of multi-stage hybrid threshold-compensated rectifiers, level-1 rectifier which is connecting the gate terminal to one previous node for the PMOS transistors (FIG. 6A) and level-3 rectifier which is connecting the gate terminal to three previous nodes (FIG. 6C) for the PMOS transistors are simulated to obtain constant maximum efficiency contour plots as shown in FIG. 7. Increasing the level of compensation leads to reduction in the threshold voltage which improves the forward-conduction but also increases the reverse leakage current. In the multipliers as shown in FIGS. 6A and 6C, during the positive input phase, transistor $M_n$ is forward-biased. Since the gate terminals are connected to the previous node, $V_{sg}$ when forward-biased is higher compared to that of the conventional diode-connected case with no threshold-voltage compensation which increases the ratio of output power in the forward region to the input power. However, when the transistor $M_n$ is reverse-biased, the $V_{sg}$ is higher compared to the conventional diode-connected case increasing the reverse leakage current of the reverse-biased transistor. This can also be explained by the efficiency contour plots of the hybrid scheme as seen from FIG. 7. The contour plots are simulated for constant efficiency with different level of compensation and input power levels. As seen from FIG. 7, though with the increase in the level of compensation the threshold voltage reduces, the efficiency degrades at the same time which is due to the increased reverse leakage current. The simulated maximum PCE of 28% degrades to 11% from level-1 compensation to level-3 compensation respectively. Accordingly an adaptive scheme is proposed to control the threshold voltage and the reverse leakage current of the rectifying device dynamically to improve the PCE over a wide range of input power. Ideally, the threshold voltage of the rectifying device should be zero when the transistors are forward-biased while the threshold voltage should be high when the transistors are reverse-biased to prevent any leakage or the losses associated with it.

We propose an adaptive forward and backward threshold-voltage compensation scheme that use minimal additional circuitry to increase the threshold-voltage compensation when transistors are forward-biased and decrease the compensation voltage when they are reverse-biased. The PMOS transistors in the main rectification chain are back-compensated when forward-biased and forward-compensated when reverse-biased; increasing the forward-current and reducing the reverse leakage current dynamically.

Proposed Adaptive Threshold Voltage Compensation

The hybrid forward and back-compensated topology described above can be made adaptive using an auxiliary block controlling the gate-source voltage of the MOS transistors in the main rectification chain. The auxiliary structure may be realized using all PMOS transistors to allow for individual body biasing. Preferably the auxiliary blocks are designed using minimum number of PMOS transistors so that the power losses do not increase considerably due to the additional blocks. The controlling voltage of the transistors in the auxiliary chain is derived from the local node of the main rectification chain. Two possible implementation of the proposed adaptive threshold voltage compensation scheme are discussed in the following section, one using diode-connected PMOS transistors and the other solid-wired connection to adaptively adjust the level of the threshold-voltage compensation.

Using Diode-connected Transistor for Back-compensation

Figure 9A:
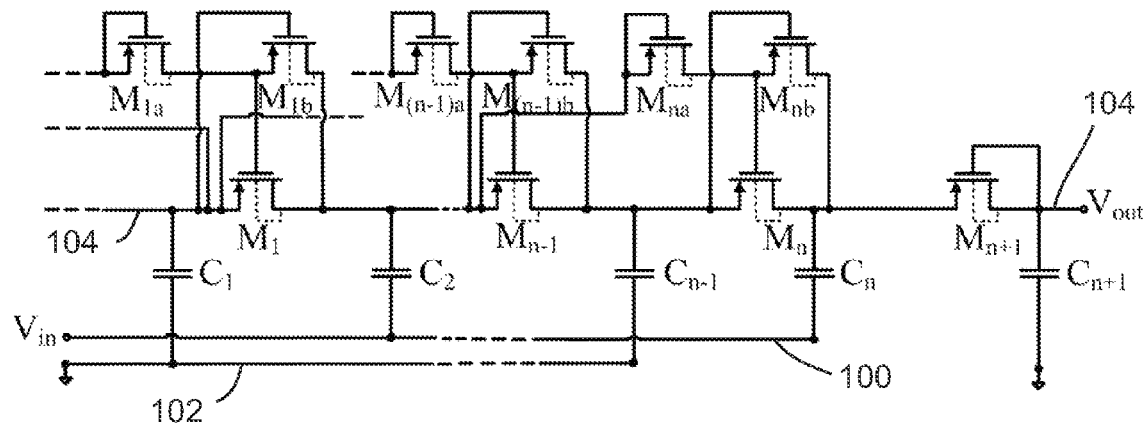
FIG. 9A is a schematic diagram of a multiplier with an adaptive threshold-voltage compensation scheme using diode-connected transistors.
Figure 10A:
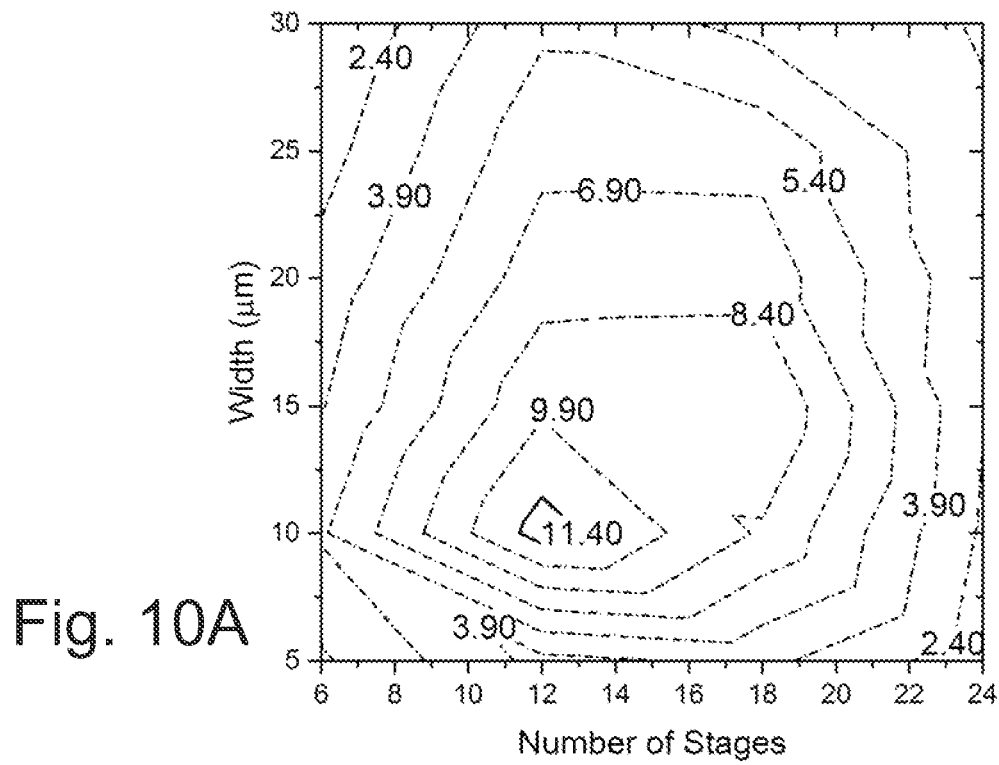
FIG. 10A is a contour plot of constant efficiency for width versus number of stages for an adaptive diode-connected scheme as shown in FIG. 9A at an operating frequency of 915 MHz.

FIG. 9A shows the hybrid forward and back-threshold compensated rectifier using diode-connected transistors for back-compensation. The back-compensation reduces the threshold voltage when the transistors are forward-biased and forward-compensation reduces the reverse leakage current when reverse-biased with the control signal derived from the local node. In the embodiment shown the last transistor $M_{n+1}$ is left uncompensated to reduce the leakage. During the negative input phase, in which the transistor $M_n$ is forward-biased, the transistor $M_n$ is back-compensated by the diode-connected transistor $M_{na}$ while the $V_{SG}$ terminal voltage for the transistor $M_{nb}$ lies below its threshold voltage resulting in transistor $M_{nb}$ turned OFF. In comparison to the embodiment shown in FIG. 6B, diode-connected transistor $M_{na}$ lies on the line connecting to the gate of transistor $M_n$. Transistor $M_{nb}$ lies on a different line not corresponding to a line in FIG. 6B, providing a forward connection for the gate of transistor $M_n$ when transistor $M_{nb}$ is active. In the embodiment shown in FIG. 9A p-type transistors are used, but n-type could also be used. Additional transistors of the opposite type may be used at one end as in FIG. 6B. The back-compensation for the transistor $M_n$ in the main chain enhances the forward current. During the positive input phase, in which the transistor $M_n$ is reverse-biased, the $V_{SG}$ terminal for transistor $M_{nb}$ is enough to turn ON the forward connection thus reducing the $V_{SG}$ bias of the transistor $M_n$ to zero resulting in a reduced leakage current. FIG. 10A shows the efficiency contour plot for the adaptive diode-connected scheme as a function of width and the number of stages of the rectifier. Generating contour plots are an effective way to optimize the number of stages and the width of the transistors to maximize the PCE while obtaining the required voltage. Twelve-stage of voltage doubler design equivalent to 24-stage rectifier with transistor width of 11 µm gives the highest efficiency contour. The width of the diode-connected transistor in the auxiliary chain should be comparable to the width of the transistors in the main rectification chain so that it provides low forward-resistance when the transistors are conducting. In an embodiment, the width of the diode connected transistor in the auxiliary chain may be 8 µm. The auxiliary transistor used for forward compensation to control the reverse-leakage is selected in an embodiment to be 480 nm, an order of magnitude smaller than the diode-connected transistor to minimize their power consumption and reduce the parasitic at the nodes of the main rectification chain. Larger transistor widths are avoided to reduce the parasitic at the nodes of the main rectification chain.

Also, for the diode-connected scheme, the auxiliary block is added for every alternate transistor starting from the later stages and adding the blocks towards the initial stages. The maximum PCE increases with the addition of the adaptive auxiliary blocks.

Using Solid Connection for Back-compensation

Figure 9B:
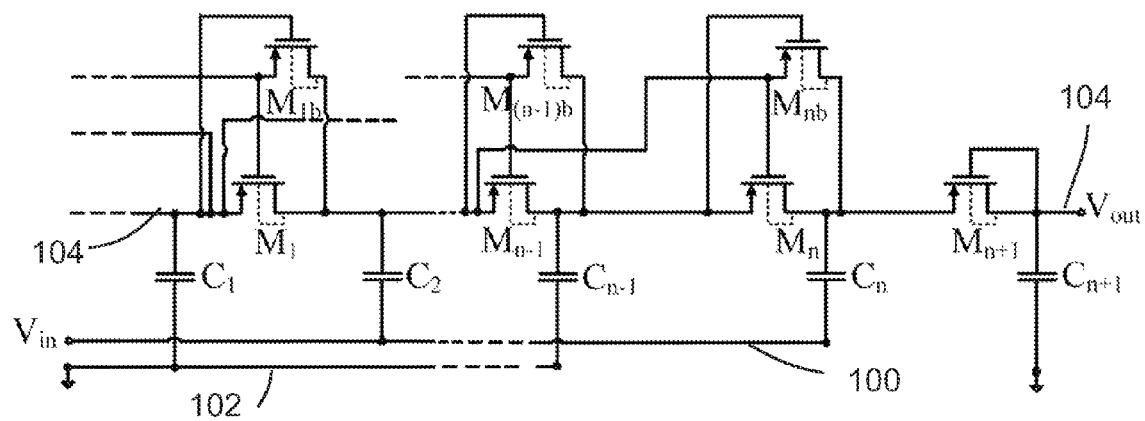
FIG. 9B is a schematic diagram of a multiplier using p-type transistors with an adaptive threshold-voltage compensation scheme using solid-wired connections.
Figure 10B:
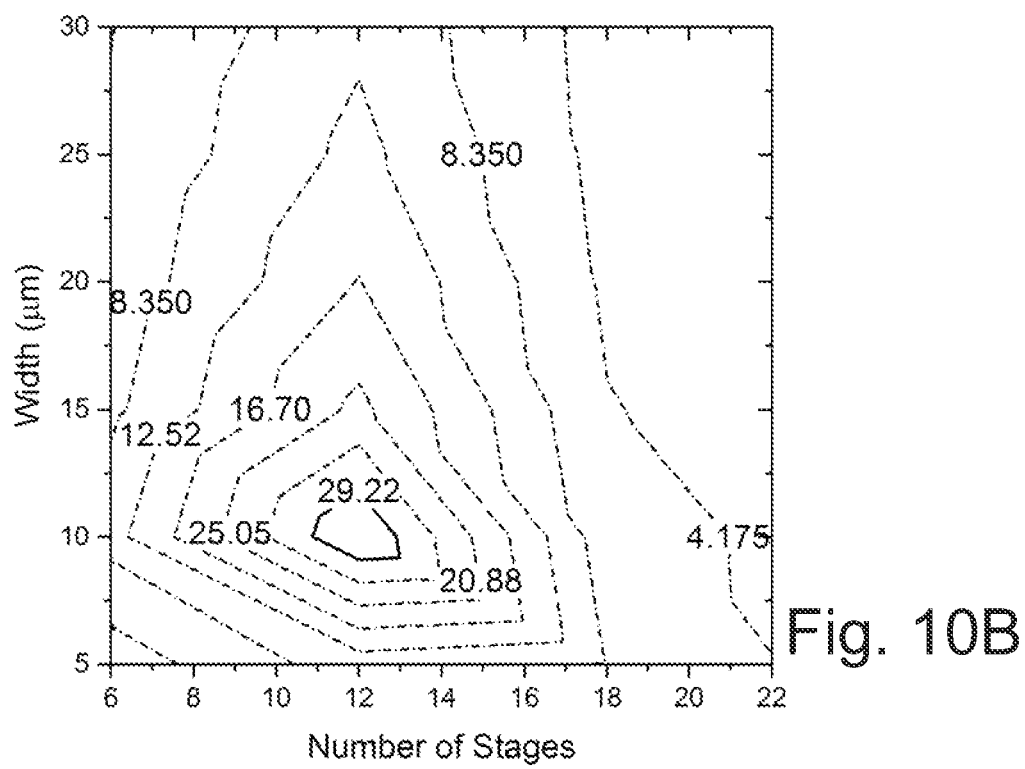
FIG. 10B is a contour plot of constant efficiency for width versus number of stages for an adaptive solid-wired scheme as shown in FIG. 9B at an operating frequency of 915 MHz.

FIG. 9B shows the adaptive hybrid topology using solid wired connection instead of the diode-connected transistor for reducing the threshold voltage. When the transistors are in the conduction phase (forward biased) they are back-compensated with solid wired connection instead of the diode-connected transistors which prevents the forward-losses associated with it. In the embodiment of FIG. 9B, as compared to FIG. 9A, the transistors $M_{na}$, $M_{(n-1)a}$ etc. are omitted and replaced by a solid wire connection as in FIG. 6B, but the transistors $M_{nb}$, $M_{(n-1)b}$ etc. are retained. In the embodiment shown in FIG. 9A p-type transistors are used, but n-type could also be used. Additional transistors of the opposite type may be used at one end as in FIG. 6B. When the transistor $M_n$ is reverse-biased (not in the conduction phase), the $V_{sg}$ terminal voltage for the auxiliary transistor $M_{nb}$ is large to turn ON the forward-connection and reduce the source-gate bias of transistor $M_n$. This decreases the reverse leakage current greatly. FIG. 10B shows an efficiency contour plot for the solid-wired scheme as a function of width and the number of stages of the rectifier. Twelve stages of doubler design equivalent to 24-stage rectifier with transistor width of 10 µm gives the maximum efficiency contour. The efficiency contour plot for the solid-connection follows similar trend as the diode-connected one. With the increase in the width of the transistors while maintaining the number of stages, the efficiency initially increases and then degrades due to the increased parasitic losses. Similarly, when the width of the transistor is kept constant and the number of stages is increased, the efficiency initially increases and then degrades as more number of stages is added due to the increased power loss with additional stages. Coupling capacitor value of 4 pF is selected as it has a very modest impact on the rectifier's efficiency.

Figure 9C:
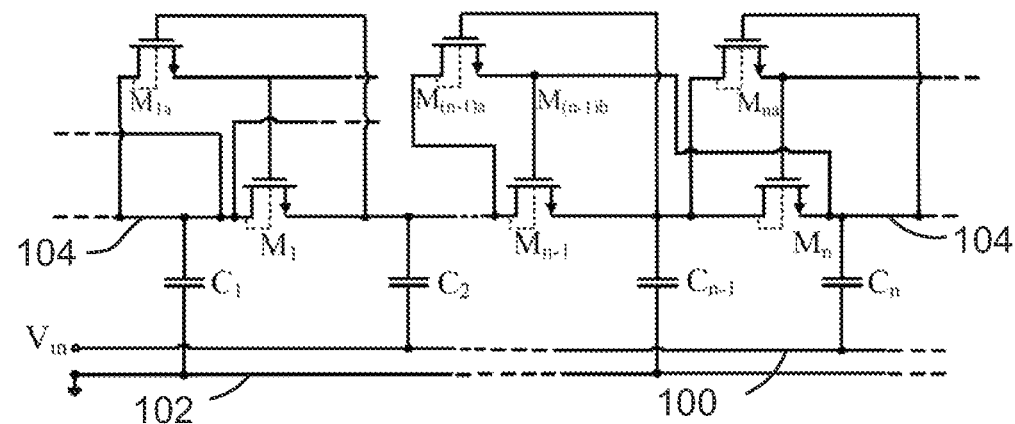
FIG. 9C is a schematic diagram of a multiplier using n-type transistors with an adaptive threshold-voltage compensation scheme using solid wired connections.
Figure 9D:
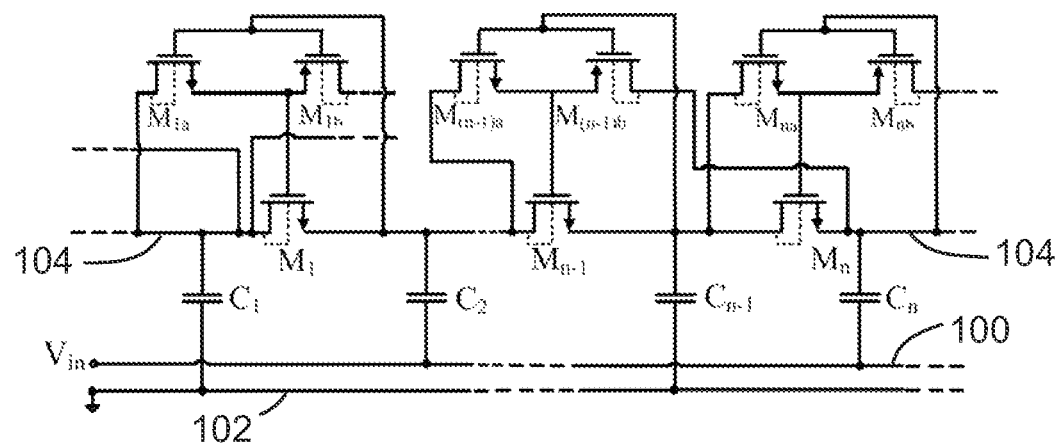
FIG. 9D is a schematic diagram of a multiplier using n-type transistors with an adaptive threshold compensation scheme using p-type and n-type transistors.

Further embodiments are shown in FIG. 9C and FIG. 9D. The embodiment of FIG. 9C operates in the same way as the embodiment of FIG. 9B but uses n-type transistors instead of p-type. Accordingly, the solid wired connections to the gates of the transistors in the main chain are to the right instead of to the left. FIG. 9D is an embodiment in which the connections to the gates of the transistors of the main chain are each controlled by two transistors. However, unlike in FIG. 9A, one of these two transistors is p-type and the other is n-type. This allows the gates of these two transistors to be controlled by the same voltage, here using a line connecting to the junction to the right of the corresponding main transistor, and have at most one of the transistors ON at any given point in the input cycle. In addition, the transistors in the main chain are n-type in FIG. 9D, whereas the transistors of the main chain are p-type in FIG. 9A. However, either of the embodiments of FIG. 9A or FIG. 9D could use n-type or p-type transistors in the main chain, with corresponding changes to the direction of connections as seen in the differences between FIG. 9B and FIG. 9C. FIGS. 9C and 9D don't show the additional transistor at the end of the rectifier that is shown as $M_{n+1}$ in FIGS. 9A and 9B, but such an additional transistor may also be present in these figures. The additional transistor can be p-type or n-type.

Figure 11A:
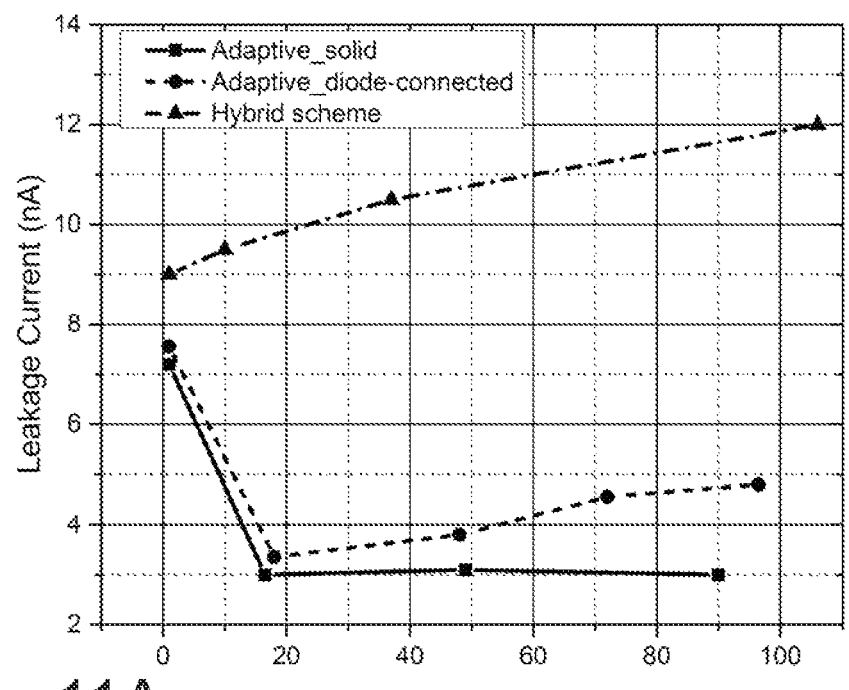
FIG. 11A is a graph of leakage current versus input power with different schemes at 915 MHz.
Figure 11B:
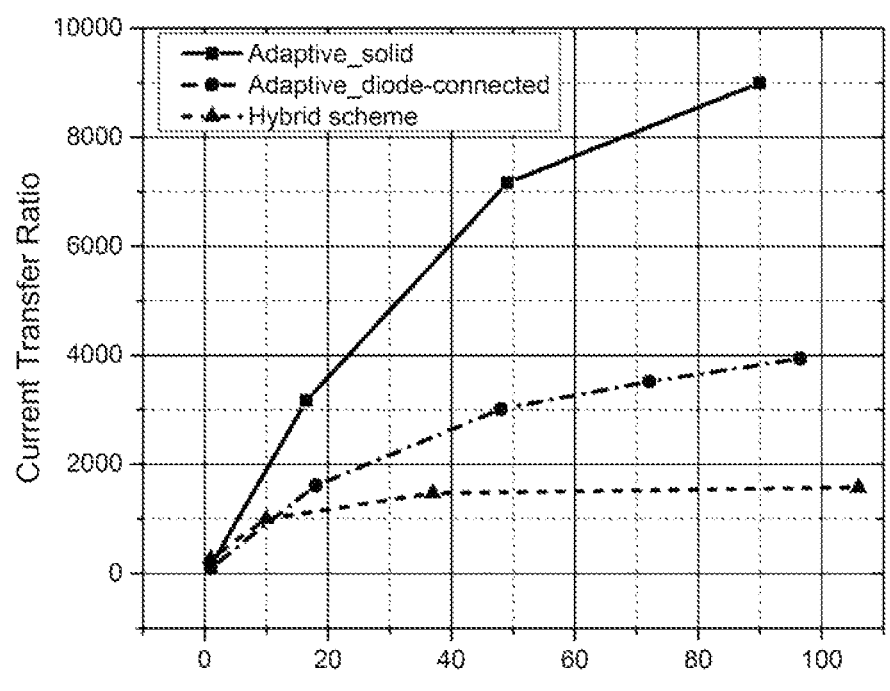
FIG. 11B is a graph of current transfer ratio versus input power with different schemes at 915 MHz.

To investigate the effectiveness of the adaptive blocks in reducing the leakage current, leakage current as a function of input power is plotted as shown in FIG. 11A. The leakage current is simulated for the last transistor with a 1 MΩ load for different input power levels. As shown in FIG. 11A, comparing the schemes i.e. hybrid, adaptive solid and adaptive diode-connected for power levels of 1 µW-100 µW and at an operating frequency of 915 MHz, the reverse leakage current is maximum for the hybrid scheme and increases with the input power. At an input power of 105 µW, the leakage current is 12 nA. The adaptive solid and the adaptive diode-connected scheme have an auxiliary transistor to control the reverse leakage current. At an input power of 1 µW, the auxiliary transistor does not have enough input power to turn ON and provide the required forward-compensation. Hence the leakage current is comparable with the hybrid scheme. At 1 µW (−30 dBm), the output transistor's leakage current is 6.96 nA for the adaptive solid scheme and 7.56 nA for the adaptive diode-connected scheme with a 1 MΩ load. As the input power increases, the leakage current for the adaptive scheme is drastically reduced as seen in FIG. 11A. Also, the reverse leakage current for the adaptive schemes is relatively constant with increase in the input power. The leakage current also depends on the load resistance and increases with decrease in the load resistance. Another performance measuring parameter we have defined is the current transfer ratio which is the ratio of the forward-current to the reverse leakage current. FIG. 11B shows the current transfer ratio as a function of input power. The current transfer ratio at an input power of 1 µW (−30 dBm) for the hybrid scheme is 270, for the adaptive solid scheme is 140 and for the adaptive diode-connected one is 108. The current transfer ratio for the adaptive solid scheme increases rapidly and outperforms the hybrid scheme from 2 µW (−27 dBm) while for the adaptive diode-connected one, the current transfer ratio intersects the hybrid curve at 11 µW. The current transfer ratio for the hybrid scheme initially increases with the input power and saturates to approximately 1500 at 100 µW of input power. The current transfer ratio for the adaptive solid scheme rapidly increases with the input power. At an input power of 90 µW, the current transfer ratio for the adaptive solid scheme is 9000 as shown in FIG. 11B. The current transfer ratio for the adaptive diode-connected scheme is 4000 at 97 µW of input power. The current transfer ratio for the adaptive-solid scheme at an input power of 100 µW (−10 dBm) is 6 times while for the diode-connected one is 2.5 times better than the hybrid scheme.

Figure 12A:
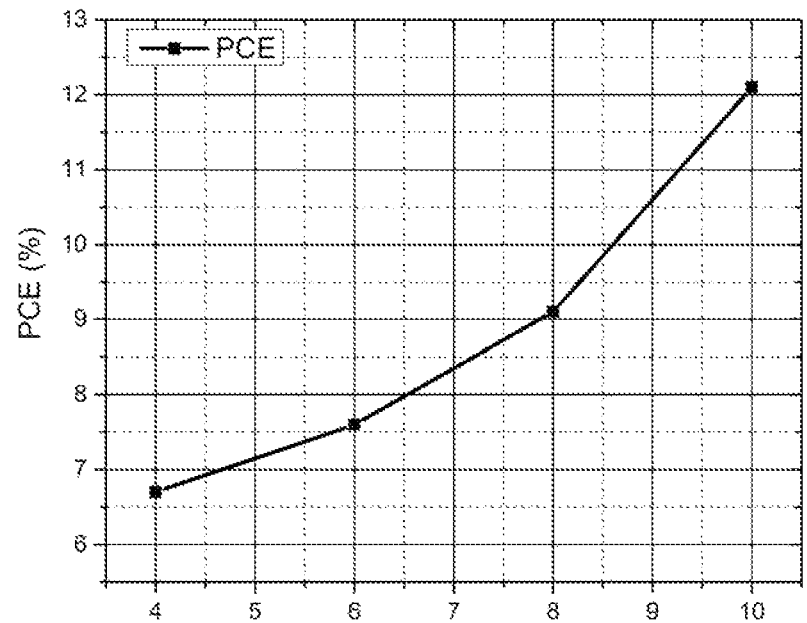
FIG. 12A is a graph of efficiency versus number of adaptive blocks for the adaptive diode-connected scheme.
Figure 12B:
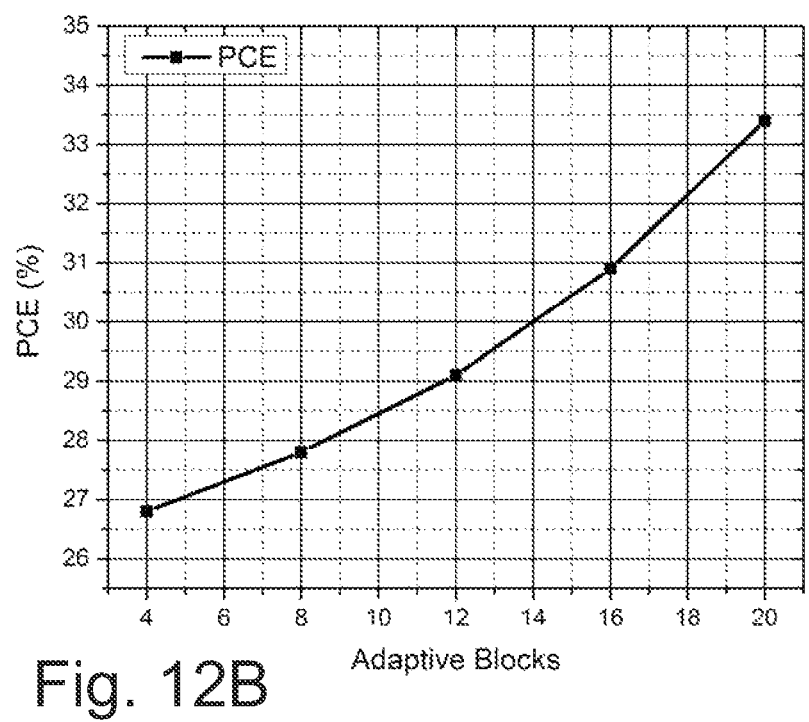
FIG. 12B is a graph of efficiency versus number of adaptive blocks for the adaptive solid-wired scheme.

The proposed adaptive scheme is effective in increasing the PCE with the addition of auxiliary adaptive blocks. The increase in the PCE with the addition of the adaptive auxiliary blocks for the adaptive diode-connected scheme is shown in FIG. 12A. With the addition of the auxiliary block the maximum PCE increases to 12%. The auxiliary block is added for every alternate transistor. However, the additional power consumed by the auxiliary diode-connected transistor when the rectifying device in the main rectification chain is forward-biased prevents the scheme from achieving higher PCEs. Unlike the adaptive diode-connected scheme, the auxiliary adaptive block is added to all the transistors for the adaptive solid scheme. Except for the first and the last stage, all the transistors for the solid adaptive scheme have the adaptive blocks. The additional power consumption and the parasitic capacitance introduced by the auxiliary chain are much lower than the former circuit as the solid-connected scheme uses only one transistor of width 480 nm per adaptive block. Hence the PCE is relatively higher at extremely low power levels. As seen from FIG. 12B, with the addition of adaptive blocks, the efficiency increases. FIG. 12B shows the improvement in PCE of the rectifier with the addition of auxiliary block. The maximum PCE reaches to 33.5% when the number of adaptive blocks is 20, a figure much higher than the adaptive diode-connected scheme which has a maximum PCE of 12%. The PCE and the output voltage performance at a relatively higher power level 0 dBm to −20 dBm is much better compared with only the hybrid scheme.

Impedance Matching Technique

Figure 13:
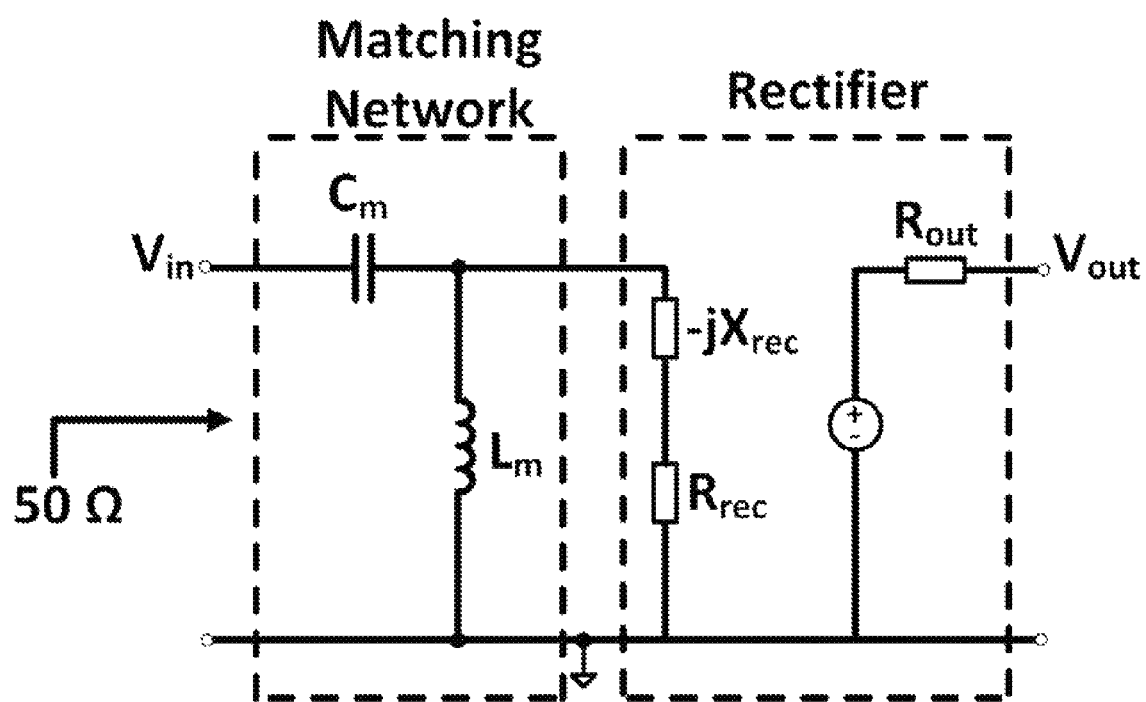
FIG. 13 is a schematic diagram showing an impedance matching circuit.

The overall PCE of the RF energy harvesting system can be improved by increasing the passive voltage amplification due to the matching network, which increases the overall voltage at the input of the rectifier. The rectifier is modeled as $R_{rec}-jX_{rec}$ where $R_{rec}$ is the real part of the rectifier's impedance and $X_{rec}$ is the imaginary part. An impedance matching circuit is designed to match it to 50 Ω as shown in FIG. 13.

The input capacitance is mainly associated with the parasitic capacitance of the transistors and the layout. As the number of stages increases, the input resistance decreases while the parasitic capacitance increases. Increase in the value of load current also decreases the input resistance. The major factor contributing to increase in load current is lower load resistance. Other factors affecting the input impedance is the aspect ratio (W/L) of the transistors, input power level. Increase in the aspect ratio, increases the parasitic capacitance whereas decreases the input resistance. At the output side, the rectifier can be modeled by a voltage source and an output resistance. Thus the non-linear characteristic of the rectifier circuit makes it difficult to analyze them. The input impedance of the rectifier can be assumed to be constant only when small signal input is applied. In this case, the transient signal is a large signal with a capacitive component at the input causing a phase difference component φ to appear. The derivation in appendix though considers the reactive impedance still assumes the linear VI relationship. In real case, the VI relationship is non-linear and the input resistance is to be found using CAD tools.

Experimental Results—Hybrid Scheme

Three rectifiers, named as "efficiency", "voltage" and "1-stage PMOS doubler" are designed and fabricated in a 0.13 µm 8-metal CMOS process. The active die areas for efficiency circuit, voltage circuit and the 1-stage PMOS doubler test circuit are 230 µm×810 µm, 230 µm×1050 µm and 160 µm×70 µm respectively. The chip is wire-bonded onto PCB board with FR4 substrate and tested with Agilent MXG-N5181 signal generator at a frequency of 915 MHz using a single-tone sinusoidal signal. The receiver power is calculated by finding the average power at the input of the rectifier. The performance of the designed efficiency and voltage circuit is measured for a range of input power levels.

Output DC voltage was measured for different peak-to-peak input voltages. For a 1 MΩ load, an input voltage of 170 mV results in 2.4 V and 2.8 V for efficiency and voltage circuit, respectively. The voltage multiplication ratio (VMR) which is the ratio of DC voltage to the peak-to-peak input voltage is 14 and 17 for efficiency and voltage circuit respectively. A 220 mV signal results in 3.1 V for efficiency circuit and 4.0 V for voltage circuit. Similarly for a 5 MΩ load, an output of 2.7 V (VMR=16) for efficiency circuit and 3.0 V (VMR=18) for voltage circuit was measured at an input peak-to-peak voltage of 170 mV. Thus, voltage circuit which has a higher level of compensation than efficiency circuit has a lower input voltage requirement.

Harvested power was measured for different received powers. From the results, it was observed that at low power-level, the harvested power has a higher dependence on load current. For a 1 MΩ load at power levels greater than −30 dBm, the rate of decay in the harvested power curve is higher than the 5 MΩ load. The roll-off in the harvested power for a 1 MΩ load starts at about −20 dBm while the roll-off point for a 5 MΩ load is approximately −30 dBm. Even for voltage circuit, the rate of decay in the harvested power curve is greater for a 1 MΩ load compared to a 5 MΩ load. A lower load value has a higher current requirement. The performance of both the circuits in terms of roll-off is similar for the same load value. The designed efficiency and voltage circuit outperforms the circuit in Papotto et al. especially at low power levels. The efficiency circuit delivers an output power of 4.7 µW at an input power of −16.8 dBm (20.9 µW) when loaded by 1 MΩ. With a 5 MΩ load, the output power is 1 µW for an input power of −17.5 dBm (17.7 µW). An output power of 3.4 µW at an input power of −14.8 dBm (33.1 µW) for a 1 MΩ load is supplied by voltage circuit. A graph of the measurements was found to be in close agreement with the simulation results.

Power efficiency was measured for different received power levels. The measured and the simulated power conversion efficiency for efficiency and voltage circuit for different load resistance values are further compared. The efficiency comparison is done while de-embedding the input reflections in Papotto et al. The output DC voltage was also measured for the efficiency and voltage circuits for different load resistance values. The PCE is optimized for low power levels. When loaded by 1 MΩ, efficiency circuit attains a maximum measured PCE of 22.6% at −16.8 dBm (20.9 µW) while delivering 2.2 V to the output. A maximum measured PCE of 21.6% is obtained by efficiency circuit while producing an output voltage of 1.1 V at an input power of −26.5 dBm (2.23 µW) for a 5 MΩ load. At an input power level of −14.8 dBm (33.1 µW), voltage circuit achieves a maximum measured PCE of 10.2% for a 1 MΩ load while delivering 1.8 V. Due to a lower load current requirement for a 5 MΩ load, the output voltage is higher compared to a 1 MΩ load. At an input power of −22.5 dBm (5.6 µW), voltage circuit has a measured output DC voltage of 1 V while efficiency circuit has a measured output DC voltage of 1.8 V at −24 dBm (4 µW) for a 5 MΩ load.

Experimental Results—Adaptive Scheme

Three RF-DC power converters named as "adaptive solid," "adaptive diode-connected" and the "hybrid" circuits were designed and fabricated side by side in a 0.13 µm metal CMOS process with eight layers of metallization. The active die areas for adaptive solid and adaptive diode-connected is 0.25 mm² and hybrid circuit is 0.15 mm². The chip is wire-bonded onto a 2-layer FR-4 PCB board and tested with Agilent MXG-N5181 signal generator using frequency modulated continuous signal in the 902-928 MHz industrial, scientific and medical (ISM) band. An off-chip L-section impedance matching network is implemented on the PCB to convert the RF-DC power converter's input impedance to 50Ω. The output DC voltage was obtained with an oscilloscope or a digital multimeter. The measured and the simulated PCE for the adaptive and the hybrid scheme were compared for a load resistance of 1 MΩ at different input power levels. The output DC voltage was measured for the adaptive and the hybrid scheme for a load resistance of 1 MΩ. The simulation is performed at a frequency of 915 MHz which is the center frequency for the 902-928 MHz ISM band. The adaptive RF-DC power converters are designed to provide high PCE and a large output DC voltage for input power levels of 1 µW-100 µW (−30 dBm to −10 dBm). At larger input power, even with lower PCE the available output power is large hence designing for high input power levels is not so crucial. The adaptive solid scheme attains a maximum PCE of 32% at an input power of 32 µW (−15 dBm) with an output DC voltage of 3.2 V for a 1 MΩ load. For the input power of 32 µW and 1 MΩ load, the hybrid scheme has a PCE of 18% and delivers 2.6 V to the output. The adaptive diode-connected scheme has a maximum PCE of 11.3% at an input power of 118 µW while delivering 3.7 V to the output. The additional power consumed by the auxiliary diode-connected transistor when the rectifying device in the main rectification chain is forward-biased prevents the adaptive diode-connected scheme from achieving higher PCEs. The PCE was measured for different input power for the adaptive solid scheme at different load resistances. The output DC voltage for the adaptive solid scheme was also measured as a function of input power for different load resistances. As the load resistance decreases, the peak conversion efficiency curve shifts towards similar efficiencies at higher input power. The maximum measured PCE is 33.4% for a load resistance of 500 kΩ load at an input power of 83 µW. The PCE for a 500 kΩ load is larger than a 1 MΩ load for input power levels greater than 50 µW (−13 dBm). The peak power conversion efficiency curve is a function of the load resistance and can provide peak efficiency at a much lower power levels for larger load resistances. With decrease in load resistance, the circuit provides a smaller output voltage than with the high load resistance due to the low load current requirement at high load resistances. The hybrid scheme provides a larger output voltage compared to the adaptive schemes for input power levels lesser than 15 µW. The adaptive scheme outperforms the hybrid scheme once the power-up threshold-requirement is met. A DC output voltage of 3.2 V is obtained at an input power of 64 µW (−12 dBm) for a 500 kΩ load.

The harvested power was measured as a function of input power for the adaptive and the hybrid scheme. When loaded by 1 MΩ, an output power of 10 µW is harvested with an input power of 250 µW (−6 dBm) for the hybrid scheme while the adaptive solid scheme harvests 10 µW with only 30 µW (−15.3 dBm) of input power. With a load resistance of 500 kΩ, 10 µW of output power is harvested at an input power of 42 µW (−13.8 dBm). An output power of 20 µW is harvested at an input power of 64 µW (−12 dBm) for a 500 kΩ load using adaptive solid scheme. For a 1 MΩ load, at larger input power, the PCE degrades much more rapidly compared to a 500 kΩ load. For a 1 MΩ load, 20 µW of power is harvested by the adaptive solid scheme at 164 µW (−7.9 dBm). Even with an input power of few milliwatts, the hybrid scheme is not effective in harvesting 20 µW of output power.

The adaptive scheme is highly effective when the input power is above 10 µW (−20 dBm) and a large output voltage (more than 1.5 V) is desired. The performance of the adaptive solid scheme is similar to the hybrid scheme for power levels of 1-10 µW (−30 dBm to −20 dBm). The sensitivity of the RF-DC power converter for obtaining an output voltage of 1 V with a 1 MΩ load for the adaptive solid scheme is 8.9 µW (−20.5 dBm). The sensitivity of the circuit using the hybrid scheme is 6.9 µW (−21.6 dBm). The adaptive diode-connected scheme gives similar performance as the adaptive solid scheme at input power levels greater than 100 µW (−10 dBm). For low power applications, the adaptive solid scheme should be preferred over the adaptive diode-connected scheme.

The forgoing description pertains to circuitry using MOSFET enhancement-mode transistors. Nothing in the description should be taken to exclude using other types of transistors with corresponding changes to the circuitry that would be obvious to a person skilled in the art.

Immaterial modifications may be made to the embodiments described here without departing from what is covered by the claims.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

APPENDIX

In section II, the average input power was suggested consisting of real and imaginary parts.

$$V = V_{in}\sin\omega t, I = I_{in}(\sin\omega t - \phi)$$

$$P_{mean} = \frac{1}{T_2 - T_1}\int_{T_1}^{T_2} V_{in}\sin\omega t \cdot I_{in}(\sin\omega t - \phi)dt$$

$$Z_{in} = \frac{V_{in}^2}{2P_{mean}} \cdot \cos\phi + \frac{V_{in}^2}{4P_{mean}} \cdot \frac{\sin[2\omega(T_2 - T_1) - \phi]}{\omega(T_2 - T_1)}$$

$Z_{in}$ consists of real and imaginary component. Equating the imaginary component to zero by considering the phase difference $\phi = 0$.

$$R_{in} = \frac{V_{in}^2}{2P_{mean}}, C_{in} = \frac{4P_{mean}(T_2 - T_1)}{V_{in}^2\sin[2\omega(T_2 - T_1) - \phi]}$$

The embodiments of the invention in which an exclusive property or privilege is claimed are defined as follows:

1. A power conversion circuit comprising:
   a first input line and a second input line, the first and second input lines configured to receive an alternating voltage differential between the first and second input lines;
   a multi-stage rectifier comprising n transistors arranged in series, where n is at least 2, each transistor having a gate, a source and a drain, adjacent transistors of the series being connected so that for adjacent p-type transistors, one of them being left p-type transistor positioned at the left-hand side and the other being right p-type transistor positioned at the right-hand side, the drain of the left p-type transistor is connected to the source of the right p-type transistor and source of the right p-type transistor is connected to the drain of the left p-type transistor, for adjacent n-type transistors, one of them being left n-type transistor positioned at the left-hand side and the other being right n-type transistor positioned at the right-hand side, the source of the left n-type transistor is connected to the drain of the right n-type transistor and drain of the right n-type transistor is connected to the source of the left n-type transistor, for a p-type transistor adjacent to an n-type transistor, n-type transistor positioned at the left-hand side and the p-type transistor positioned at the right-hand side, the source of the p-type transistor is connected to the source of the n-type transistor and drain of the p-type transistor is connected to the drain of the n-type transistor to form a junction, each junction being connected to one of the first input line and the second input line via a capacitor, with adjacent junctions having one junction of the adjacent junctions connected to the first input line and the other junction of the adjacent junctions connected to the second input line;
   the gate of a $k^{th}$ transistor of the multi-stage rectifier, where k is a number between 1 and n, is connected to the source of the $(k-1)^{th}$, or the $(k-2)^{th}$, ..., or the $1^{st}$ main transistor for the p-type transistor or to the source of the $(k+1)^{th}$, or the $(k+2)^{th}$, ..., or the $n^{th}$ main transistor for the n-type transistor, at least one of the transistor in the multi-stage rectifier being p-type and at least one being n-type.

2. The power conversion circuit of claim 1 further comprising an auxiliary chain of n p-type transistors, each auxiliary transistor having a gate, a source and a drain, each transistor of the auxiliary chain being connected to a p-type transistor of the multi-stage rectifier in the main chain, so that the gate of the $k^{th}$ main auxiliary transistor, where k is a number between 1 and n, is connected to the source of the $k^{th}$ main transistor, the source of the $k^{th}$ auxiliary transistor is connected to the gate of the $k^{th}$ main transistor and also connected to the source of the $(k-1)^{th}$, or the $(k-2)^{th}$, ..., or the $1^{st}$ main transistor, and the drain of the $k^{th}$ auxiliary transistor is connected to the drain of the $k^{th}$ main transistor or the drain of the $(k+1)^{th}$, or the $(k+2)^{th}$, ..., or the $n^{th}$ main transistor.

3. The power conversion circuit of claim 2 further comprising a diode connected transistor on a line connecting the gate of the $k^{th}$ main transistor to the source of the $(k-1)^{th}$, or the $(k-2)^{th}$, ..., or the $1^{st}$ main transistor.

4. The power conversion circuit of claim 1 further comprising an auxiliary chain of n n-type transistors, each auxiliary transistor having a gate, a source and a drain, each transistor of the auxiliary chain being connected to an n-type transistor of the multi-stage rectifier in the main chain, so that the gate of the $k^{th}$ auxiliary transistor, where k is a number between 1 and n, is connected to the source of the $k^{th}$ main transistor, the source of the $k^{th}$ auxiliary transistor is connected to the gate of the $k^{th}$ main transistor and also connected to the source of the $(k+1)^{th}$, or the $(k+2)^{th}$, ..., or the $n^{th}$ main transistor, and the drain of the $k^{th}$ auxiliary transistor is connected to the drain of the $k^{th}$ main transistor or to the drain of the $(k-1)^{th}$, or the $(k-2)^{th}$, ..., or the $1^{st}$ main transistor.

5. The power conversion circuit of claim 4 further comprising a diode connected transistor on a line connecting the gate of the $k^{th}$ main transistor to the source of the $(k+1)^{th}$, or the $(k+2)^{th}$, ..., or the $n^{th}$ main transistor.

6. The power conversion circuit of claim 1 further comprising an additional transistor connected in series with the multistage rectifier, the additional transistor having a gate, a source and a drain, the gate of the additional transistor being connected to the drain of the additional transistor.

7. The power conversion circuit of claim 1 in which the gate of the $k^{th}$ transistor is connected to the source of the $(k-1)^{th}$, or the $(k-2)^{th}$, ..., or the $1^{st}$ transistor for p-type transistor and to the source of the $(k-1)^{th}$, or the $(k-2)^{th}$, ..., or the $1^{st}$ main transistor for n-type transistor.

8. The power conversion circuit of claim 7 in which N of the transistors in the multistage rectifier arranged in series are n-type and all but N of the transistors in multistage rectifier arranged in series are p-type.

9. The power conversion circuit of claim 1 in which the second input line is grounded.

10. The power conversion circuit of claim 1 in which the body terminal of each p-type transistor is connected to the respective drain and the body terminal of each n-type transistor is either grounded or connected to the respective drain terminal.

11. A power conversion circuit comprising:
an auxiliary chain of n auxiliary transistors, where n is at least 2, each auxiliary transistor having a gate, a source and a drain; a main chain of n main transistors connected in series, each main transistor having a gate, a source and a drain; each transistor of the auxiliary being connected to a respective transistor of the main chain of multi-stage rectifier;
wherein, if the auxiliary and main transistors are n-type, the gate of a $k^{th}$ auxiliary transistor, where k is a number between 1 and n, is connected to the source of the $k^{th}$ main transistor, the source of the $k^{th}$ auxiliary transistor is connected to the gate of the $k^{th}$ main transistor, the source of the $k^{th}$ auxiliary transistor is also connected to the source of the $(k+1)^{th}$, or the $(k+2)^{th}$, ..., or the $n^{th}$ main transistor, and the drain of the $k^{th}$ auxiliary transistor is connected to the drain of the $k^{th}$ main transistor;
and
wherein, if the auxiliary and main transistors are p-type, the gate of a $k^{th}$ auxiliary transistor is connected to the source of the $k^{th}$ main transistor, the source of $k^{th}$ auxiliary transistor is connected to the gate of the $k_{th}$ main transistor, the source of the $k^{th}$ auxiliary transistor is also connected to the source of the $(k-1)^{th}$, or the $(k-2)^{th}$, ..., or the $1^{st}$ main transistor, and the drain of the $k^{th}$ auxiliary transistor is connected to the drain of the $k^{th}$ main transistor.

12. The power conversion circuit of claim 11 in which the transistors of the main chain and auxiliary chain are n-type and further comprising a p-type transistor on a line connecting the gate of the $k^{th}$ main transistor to the source of the $(k+1)^{th}$, or the $(k+2)^{th}$, ..., or the $n^{th}$ main transistor, such that the gate of the additional p-type auxiliary transistor is connected to the gate of the $k^{th}$ n-type auxiliary transistor, and the source of the additional p-type auxiliary transistor is connected to the source of the $k^{th}$ n-type auxiliary transistor, and the drain of the additional p-type auxiliary transistors is connected to the source of the $(k+1)^{th}$, or the $(k+2)^{th}$, ..., or the $n^{th}$ main transistor.

13. The power conversion circuit of claim 11 in which the transistors of the main chain and auxiliary chain are p-type and further comprising an n-type transistor on a line connecting the gate of the $k^{th}$ main transistor to the source of the $(k-1)^{th}$, or the $(k-2)^{th}$, ..., or the $1^{st}$ main transistor, such that the gate of the additional n-type auxiliary transistor is connected to the gate of the $k^{th}$ p-type auxiliary transistor and the source of the additional n-type auxiliary transistor is connected to the source of the $k^{th}$ n-type auxiliary transistor, and the drain of the additional n-type auxiliary transistors is connected to the source of the $(k-1)^{th}$, or the $(k-2)^{th}$, ..., or the $1^{st}$ main transistor.

14. The power conversion circuit of claim 11 in which the transistors of the main chain and auxiliary chain are n-type and further comprising a diode connected p-type or n-type transistor on a line connecting the gate of the $k^{th}$ main transistor to the source of the $(k+1)^{th}$, or the $(k+2)^{th}$, ..., or the $n^{th}$ main transistor.

15. The power conversion circuit of claim 11 in which the transistors of the main chain and auxiliary chain are p-type and further comprising a diode connected p-type or n-type transistor on a line connecting the gate of the $k^{th}$ main transistor to the source of the $(k-1)^{th}$, or the $(k-2)^{th}$, ..., or the $1^{st}$ main transistor.

* * * * *